United States Patent
Sakai et al.

(10) Patent No.: US 7,742,841 B2
(45) Date of Patent: Jun. 22, 2010

(54) AUTONOMOUS VEHICLE AND PLANAR OBSTACLE RECOGNITION METHOD

(75) Inventors: Tatsu Sakai, Suita (JP); Daisuke Nishimura, Tsu (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 390 days.

(21) Appl. No.: 11/813,964

(22) PCT Filed: Feb. 23, 2006

(86) PCT No.: PCT/JP2006/303923
§ 371 (c)(1),
(2), (4) Date: Jul. 13, 2007

(87) PCT Pub. No.: WO2006/090896
PCT Pub. Date: Aug. 31, 2006

(65) Prior Publication Data
US 2009/0069938 A1 Mar. 12, 2009

(30) Foreign Application Priority Data
Feb. 23, 2005 (JP) ............................. 2005-047885
Sep. 27, 2005 (JP) ............................. 2005-279437

(51) Int. Cl.
*G05D 1/02* (2006.01)
(52) U.S. Cl. ...................... 700/255; 382/103
(58) Field of Classification Search ................ 700/245, 700/255, 258; 701/1, 23, 26, 301; 180/9.32
See application file for complete search history.

(56) References Cited

U.S. PATENT DOCUMENTS

| 6,515,614 | B2 | 2/2003 | Sakai et al. | |
| 2004/0158355 | A1* | 8/2004 | Holmqvist et al. | 700/245 |
| 2005/0225439 | A1* | 10/2005 | Watanabe et al. | 340/435 |
| 2006/0184274 | A1 | 8/2006 | Sakai et al. | |

OTHER PUBLICATIONS

Mendes et al., "Situation-based Multi-target Detection and Tracking with Laserscanner in Outdoor Semi-structured Environment", Proceedings of 2004 IEED/RSJ International Conference on Intelligent Robots and Systems, IEEE, vol. 1, pp. 88-90 (Sep. 2004).

(Continued)

*Primary Examiner*—Khoi Tran
*Assistant Examiner*—Rodney King
(74) *Attorney, Agent, or Firm*—Greenblum & Bernstein, P.L.C.

(57) ABSTRACT

In an autonomous vehicle, position of a planar obstacle such as a wall or a fence having apertures is determined. A horizontal plane is scanned with a laser range tinder so as to acquire positional coordinates of a plurality of scanning points. An element vector is formed with each two scanning points so that one acquired former is used as a start point and the other acquired later as an end point of the vector. A plurality of continuous element vectors which satisfy predetermined conditions is selected among the element vectors, and a scanning segment vector is formed by composition of the selected element vectors. When a length of the scanning segment vector is equal to or longer than a predetermined length, it is possible to recognize that a planar obstacle exists along the scanning segment vector.

22 Claims, 22 Drawing Sheets

OTHER PUBLICATIONS

Wei et al., "The Approach Extracting Features from the Local Environment for Mobile Robot", Proceedings of the First International Conference on Machine Learning and Cybernetics, IEEE, vol. 2, pp. 611-616, (Nov. 2002).

Yamamoto et al., "An Implementation of Landmark-based Position Estimation Function as an Autonomous and Distributed System for a Mobile Robot", Proceeding of the 1999 IEEE/RSJ International Conference on Intelligent Robots and Systems, IEEE vol. 2, pp. 1141-1148, (Oct. 1999).

Iikura et al., "Real-Time 2D Map Building for an Unmanned Vehicle in a Closed Area", SICE Annual Conference in Fukui, IEEE vol. 1, pp. 1081-1085, (Aug. 2003).

Feng et al., "Implementation of Dynamic Obstacle Avoidance on the CMU NavLab", IEEE, pp. 208-211 (Aug. 1990).

K.O. Arras et al., "Feature Extraction and Scene Interpretation for Map-Based Navigation and Map Building", Proceedings of SPIE, Mobile Robotics XII, vol. 3210, 1997, retrieved from the internet at www.nada.kth.se/{kai-a/>.

Zhang et al., "Line Segment Based Map Building and Localization Using 2D Laser Rangefinder", Proceedings of the 2000 IEEE International Conference on Robotics & Automation , pp. 2538-2543, (Apr. 2000).

* cited by examiner

FIG. 12
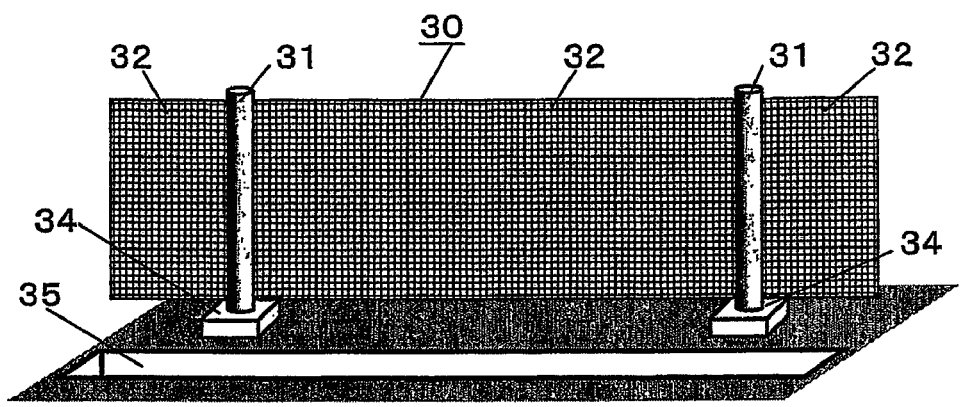
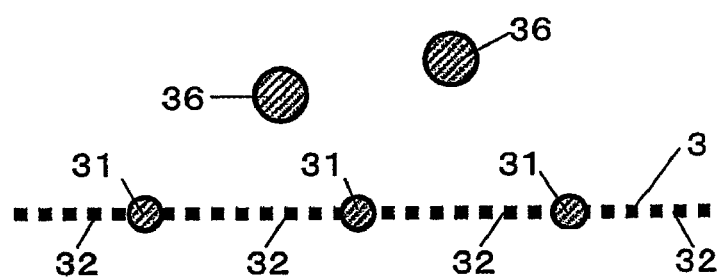
FIG. 13A
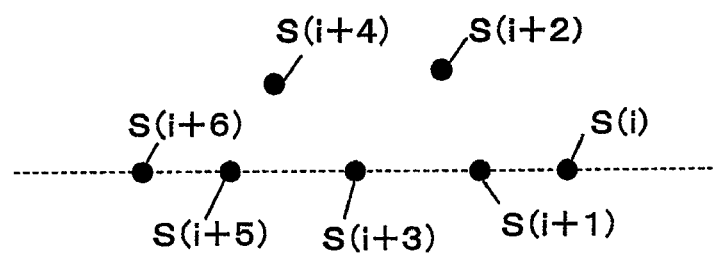
FIG. 13B
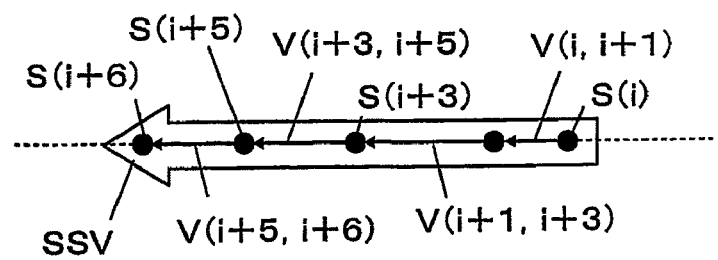
FIG. 13C

| STARTx | STARTy | ENDx | ENDy | APERTURE |
|---|---|---|---|---|
| x0 | y0 | x1 | y1 | 0 |
| x1 | y1 | x2 | y2 | 0 |
| x2 | y2 | x3 | y3 | 0 |
| x3 | y3 | x4 | y4 | 0 |
| x4 | y4 | x5 | y5 | 0 |
| x5 | y5 | x6 | y6 | 0 |
| x6 | y6 | x7 | y7 | 0 |
| x7 | y7 | x0 | y0 | 0 |
| x8 | y8 | x9 | y9 | 1 |
| x9 | y9 | x10 | y10 | 1 |
| x10 | y10 | x11 | y11 | 1 |
| x11 | y11 | x12 | y12 | 1 |
| x12 | y12 | x13 | y13 | 1 |
| x13 | y13 | x8 | y8 | 1 |

APERTURE PROPERTY
1: EXISTENCE
0: NONEXISTENCE

AUTONOMOUS VEHICLE AND PLANAR OBSTACLE RECOGNITION METHOD

TECHNICAL FIELD

The present invention relates to an autonomous vehicle, and especially relates to a planar obstacle recognition method installed in the autonomous vehicle and suitable for autonomous travel.

BACKGROUND ART

Conventionally, a method for recognizing positions on a surface of a wall (planar obstacle) is known from the document (Li Zhang & Bijoy K. Ghosh, "Line Segment Based Map Building and Localization Using 2D Laser Range finder", IEEE Int. Conf. On Robotics & Automation, pp. 2538-2543, 2000). In the conventional method, a horizontal plane is scanned at an every constant angle or a constant distance with using a laser radar so that a group of scanning points each distributed in two-dimensional surface is acquired by receiving reflected waves from an object. A plurality scanning points are selected with specific assumptions from the group of the scanning points, and an aggregation of segments is formed by coupling the selected scanning points. The wall distributed in the horizontal plane can be recognized by the aggregation of segments.

In the above mentioned conventional method for recognizing the planar obstacle, it, however, includes a step repeating a calculation for acquiring a distance from a specific point to a specific segment in a plurality of times when specific scanning points are selected among a lot of the scanning points and the aggregation of segments is formed. Thus, the calculation process becomes complex and requires a long time. If the method is installed in the autonomous vehicle for recognizing the planar obstacle, the moving speed of the autonomous vehicle may be slowed so as to autonomously move the autonomous vehicle safely and surely. Therefore, it is necessary to simplify the planar obstacle recognition method so as to be installed in the autonomous vehicle. In addition, according to the conventional planar obstacle recognition method, when the planar obstacle has apertures like a meshed or grated fence, reflected waves from an object disposed behind the planar obstacle are received, so that it is difficult to recognize the planar obstacle having apertures, accurately. Therefore, no method which can recognize the planar obstacle having apertures is put into practical use as the planar obstacle recognition method which is suitable for autonomous vehicle.

DISCLOSURE OF INVENTION

The present invention is conceived to solve the above mentioned problems and to provide an autonomous vehicle which can autonomously move effectively and safely by recognizing a planar obstacle, especially a location of a planar obstacle having apertures by simple steps precisely, and to provide a planar obstacle recognition method suitable for the autonomous vehicle.

An autonomous vehicle in accordance with an aspect of the present invention comprises:

a scanning point acquisition unit scanning a predetermined space at a constant angle or a constant interval with using an electromagnetic wave or an acoustic wave, receiving reflected waves from objects existed in the horizontal plane, and acquiring coordinates of a plurality of scanning points from which the electromagnetic wave or the acoustic wave is reflected;

an element vector forming unit forming an element vector with respect to two scanning points selected among the plurality of scanning points so that one scanning point acquired earlier in time series by the scanning point acquisition unit is used as a start point of the element vector and another scanning point acquired later is used as an end point of the element vector;

an element vector selecting unit selecting a plurality of element vectors which are continued in time series of order of formation by the element vector forming unit, length of each element vector being equal to or shorter than a first predetermined length, a deflection angle of an element vector with respect to another continuing element vector being equal to or smaller than a first predetermined angle, and an integrated value of the deflection angles being equal to or smaller than a second predetermined angle;

a scanning segment vector forming unit forming one scanning segment vector by composing the selected continuing element vectors; and an obstacle recognizing unit comparing a segment defined by a start point and an end point of the scanning segment vector with a second predetermined length, and recognizing that a planar obstacle exists along the scanning segment vector when the segment is equal to or longer than the second predetermined length.

With such a configuration, when each length of the continuing element vectors is equal to or shorter than the first predetermined length, the deflection angle of one element vector with respect to another continuing element vector is equal to or smaller than the first predetermined angle, and the integrated value of the deflection angles is equal to or smaller than the second predetermined value, it can be regarded that the scanning points used for forming the element vectors are disposed on the same obstacle. Furthermore, when the length of the scanning segment vector formed by composition of the element vectors is equal to or longer than the second predetermined length, it can be regarded that the obstacle is a planar obstacle. The scanning segment vector represents a position, an orientation and a size of the planar obstacle, so that the self location recognition unit can be specified the self location of the autonomous vehicle on a map precisely based on a distance and a direction to the planar obstacle, and thereby the autonomous vehicle can move safely by avoiding the planar obstacle identified by the scanning segment vector when the autonomous vehicle performs the autonomous travel. Still furthermore, the recognition of the planar obstacle can be performed by relatively simple processes such as acquirement of the scanning points, formation of the element vectors, selection of the element vectors, formation of the scanning segment vector and comparison of the scanning segment vector. Thus, it is possible to recognize the planar obstacle faster in comparison with the conventional method. Consequently, effective autonomous travel can be realized by increasing the moving speed of the autonomous vehicle.

BRIEF DESCRIPTION OF DRAWINGS

FIG. 12 is a perspective view showing a fence having apertures as another example of the planar obstacle.

FIG. 13A is a plain view of the fence having apertures shown in FIG. 12, FIG. 13B is a diagram showing scanning points S corresponding to pole braces of the fence, and FIG. 13C is a diagram showing element vectors V and a scanning segment vector SSV formed by the scanning points S.

BEST MODE FOR CARRYING OUT THE INVENTION

Figure 1:
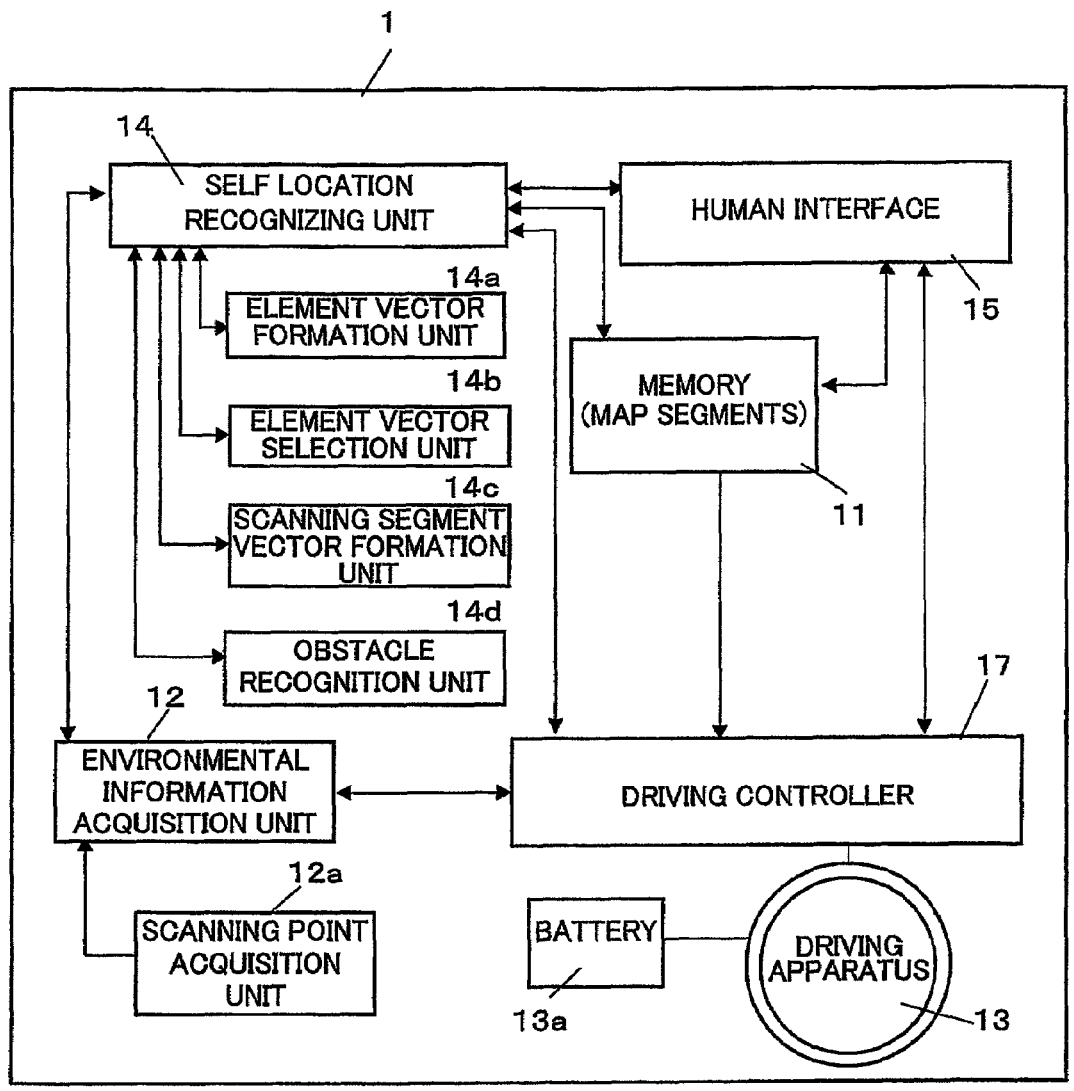
FIG. 1 is a block diagram showing a configuration of an autonomous vehicle in accordance with the present invention.

An autonomous vehicle and a planar obstacle recognition method suitable for the autonomous vehicle in accordance with an embodiment of the present invention are described with reference to the figures. FIG. 1 shows a block constitution of the autonomous vehicle 1 of the present invention. The autonomous vehicle 1 is comprised of a memory 11 for memorizing map information of an operation area thereof and various parameters used for driving thereof, an environmental information acquisition unit 12 for acquiring environmental information used for recognizing location of an obstacle and self location, a driving apparatus 13 for driving the autonomous vehicle 1, a self location recognition unit 14 for recognizing the self location of the autonomous vehicle 1 by referring the environmental information acquired by the environmental information acquisition unit 12 with the map information memorized in the memory 11, a human interface 15 used for inputting a destination in the operation area and parameters for driving, and a driving controller 17 for controlling the driving apparatus 13 while avoiding obstacles with recognizing the self location based on the recognition result of the self location recognition unit 14.

The driving apparatus 13 comprises motors driven by electric power of a battery cell 13a. In each motor, an encoder for measuring rotation number or rotation speed is provided. The driving controller 17 of the autonomous vehicle 1 can know moving distances and moving orientations with using the outputs of the encoder, and thereby, performs dead reckoning estimation navigation based on the moving distances and the moving orientations. The human interface 15 is constituted with a touch panel or a keyboard which is directly operated by a user or a communication device by which remote control can be performed.

As for the map information, an aggregation of segments which represent planar obstacles such as a wall, a fence or a barrier in the operation area are previously set as map segments and memorized in the memory 11. The environmental information acquisition unit 12 comprises a scanning point acquisition unit 12a such as a laser radar by which a specific position on a main body of the autonomous vehicle 1 is set as an origin, and a space facing the origin with a constant angle or a constant interval is scanned. Thereby, position coordinates of points on obstacles including the planar obstacle such as a wall are acquired at each direction from the origin, and the scanning points which are an aggregation of a plurality of position coordinates are acquired in order of time series of the scan.

The scanning point acquisition unit 12a is disposed, for example, on a front portion of the main body of the autonomous vehicle 1, and acquires position coordinates of the objects which reflect laser beams as scanning points by scanning a front space in a horizontal plane or an inclined plane of predetermined height and receiving reflected waves from the planar obstacle such as a wall or other environmental object. Alternatively, an ultrasonic sensor, which is a combination of an ultrasonic wave emitting device and an array of ultrasonic wave receiving device, thereby performing electric scan, can be used as the scanning point acquisition unit 12a. Alternatively, an ultrasonic sensor used for normal obstacle detection can be used for detecting an obstacle by the environmental information acquisition unit 12. The scanning points acquired by the scanning point acquisition unit 12a are the projection of the position coordinates of the portions reflecting the laser beam or ultrasonic wave on a horizontal plane.

The self location recognition unit 14 further comprises an element vector formation unit 14a, an element vector selection unit 14b, a scanning segment vector formation unit 14c and an obstacle recognition unit 14d. The element vector formation unit 14a forms an element vector with respect to two scanning points using one scanning point acquired earlier in time series as a start point and the other scanning point acquired later as an end point. The element vector selection unit 14b selects a plurality of element vectors which are continued among a lot of element vectors satisfying the conditions that a length of each element vector is equal to or shorter than a first predetermined length, a deflection angle of an element vector against another continuing element vector is equal to or smaller than a first predetermined angle, and an integrated value of the deflection angles is equal to or smaller than a second predetermined angle. The scanning vector formation unit 14c forms one scanning segment vector by composition of selected continuing element vectors. The obstacle recognition unit 14d compares a segment defined by a start point and an end point of a scanning segment vector with a second predetermined length, judges that a planar obstacle exists along the scanning segment vector when the length of the segment is equal to or longer than the second predetermined length, and specifies the position of the planar obstacle on a map with reference to a scanning segment extracted from the scanning segment vector and the map segments. Consequently, the self location recognition unit 14 can be specified the self location of the autonomous vehicle 1 on the map precisely based on a distance and a direction to the planar obstacle.

The above mentioned memory 11, self location recognition unit 14, the element vector formation unit 14a, the element vector selection unit 14b, the scanning segment vector formation unit 14c, the obstacle recognition unit 14d, and the driving controller 17 can be achieved by performing predetermined programs in a computer having a popular constitution having a CPU, an external memory device, a display device and an input device.

Figure 2:
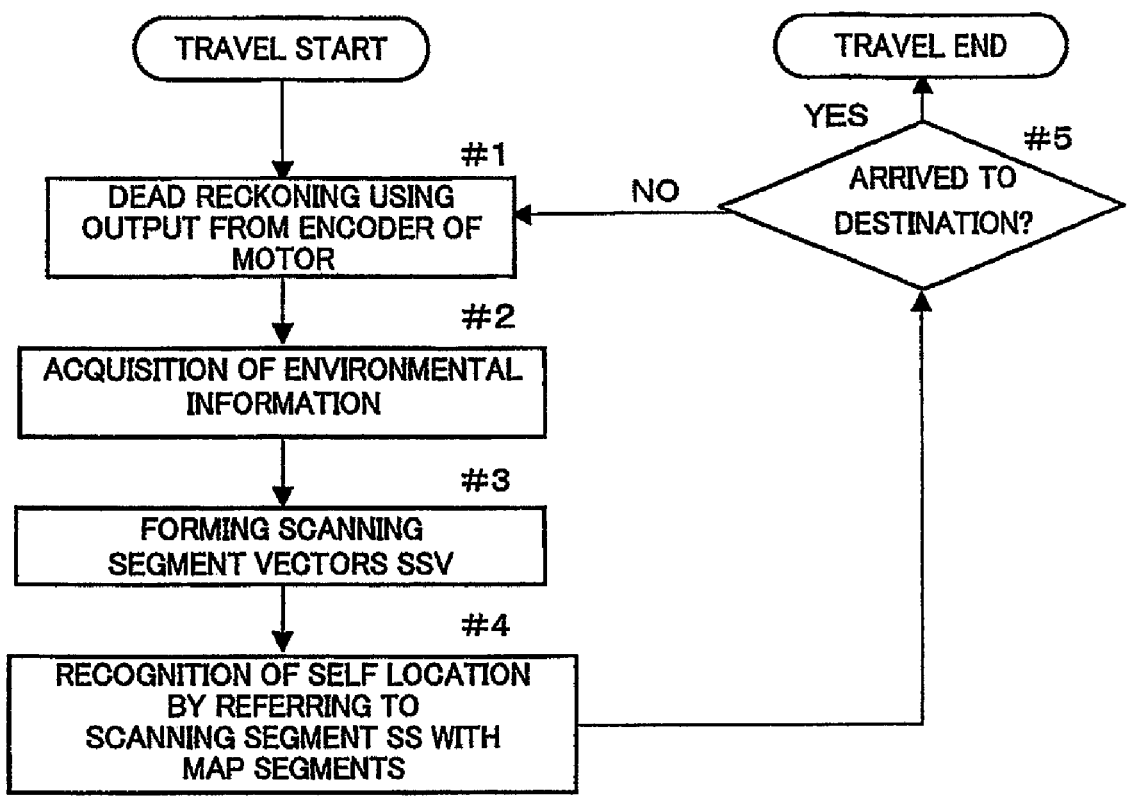
FIG. 2 is a flowchart of autonomous travel of the autonomous vehicle using a planar obstacle recognition method in accordance with the present invention.

Subsequently, steps for autonomously moving the autonomous vehicle 1 with recognizing the self location with using the above planar obstacle recognition method is described with reference to FIG. 2. The moving controller 17 knows an approximate location of the autonomous vehicle 1 on the basis of information outputted from the encoder of the drive motor of the driving apparatus 13. The autonomous vehicle 1 performs the dead reckoning on the basis of information of the self location from the start of driving (#1). The scanning point acquisition unit 12a acquires a group of scanning points in a front area in moving direction under the control of the environmental information acquisition unit 12 (#2). Subsequently, the element vector formation unit 14a forms element vectors from the group of the scanning points. The element vector selection unit 14b selects a plurality of element vectors which satisfy the above mentioned conditions. Then, the scanning vector formation unit 14c composes scanning segment vectors SSV (#3).

In a following step, the obstacle recognition unit 14d extracts a segment having a length equal to or longer than the second predetermined length among the segments each defined by the start point and the end point of the scanning segment vectors SSV, and judges that the extracted segments correspond to scanning segments SS which are segments representing planar obstacles existing in the moving environment. Furthermore, the obstacle recognition unit 14d specifies the positions of the planar obstacles on the map with reference to the scanning segment SS and the map segments which are the aggregation of the segments of the planar obstacles in the map information. The self location identification unit 14 specifies the self location of the autonomous vehicle 1 on the map of the operation area thereof on the basis of the positions of the planar obstacles on the map, distances and directions to the planar obstacles from the above origin (self location) (#4).

The driving controller 17 renews the self location of the moving autonomous vehicle 1 to a more precise location when it receives the consequence of the self location recognition by the self location recognition unit 14 so as to continue the driving control of the autonomous vehicle 1. When the autonomous vehicle 1 arrives to the destination (YES in step #5), the driving controller 17 completes the migration of the autonomous vehicle 1. Alternatively, when the autonomous vehicle 1 has not arrived to the destination yet (NO in step #5), the above mentioned steps #1 to #5 are repeated at a predetermined time interval.

Subsequently, an acquisition method of the scanning points and the definition of terms in the planar obstacle recognition method are explained with reference to FIGS. 3A, 3B, 4, and 5A to 5D. Each scanning point is the information of the position coordinate from the origin to a portion of an obstacle which reflects the laser beam acquired by irradiating a laser beam by the laser radar as the scanning point acquisition unit 12a to a front or a noteworthy direction at a constant interval, and receiving the reflected waves reflected by an obstacle including the planar obstacle such as a wall. A group of the scanning points is an aggregation of a plurality of the position coordinates of the portions which reflect the laser beams from the origin. In case that the positions of the planar obstacles are already specified as the environmental information on the map, the position of the planar obstacles can be used for recognizing the self location of the autonomous vehicle 1 when the planar obstacle can be specified.

Figure 3A:
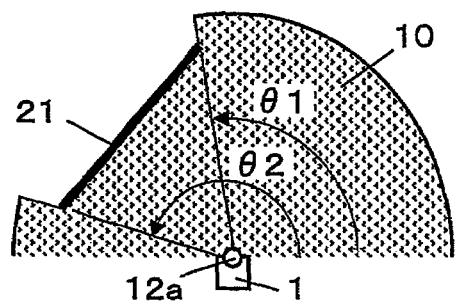
FIG. 3A is plain view showing a state to recognize a planar obstacle having no aperture by the above planar obstacle recognition method.
Figure 3B:
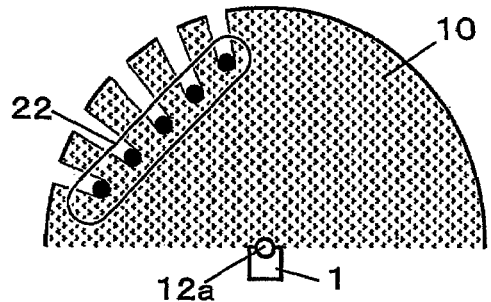
FIG. 3B is a plain view showing a state to recognize a planar obstacle having apertures.

A planar and continuous all 21 of a building shown in FIG. 3A and a discontinuous grating fence, a meshed fence or a louver 22 out of doors show in FIG. 3B are included in the planar obstacles. As shown in FIG. 3A, the coordinate data of the scanning points are acquired as data of an area 10 of 180 degrees in front of the autonomous vehicle 1 in a predetermined length from the origin of a specific point on the main body of the autonomous vehicle 1. The wall 21 is detected in an area from an angle θ to an angle θ2.

Figure 4:
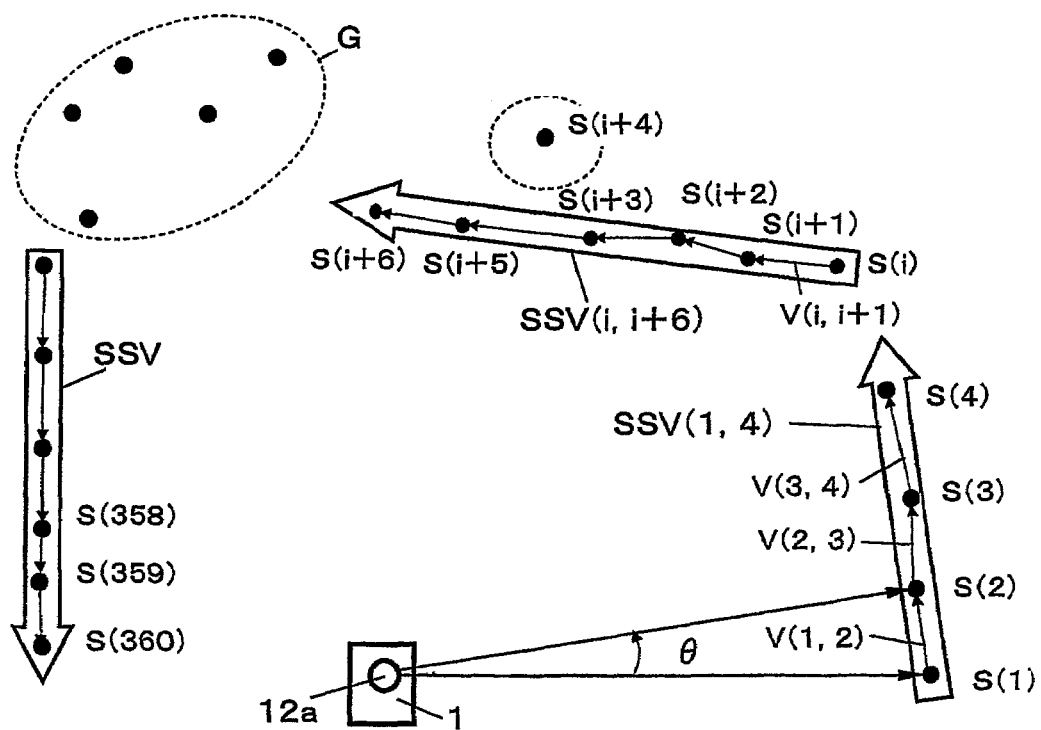
FIG. 4 is an explanation diagram showing a state to form a scanning segment vector representing a planar obstacle from scanning points by the above planar obstacle recognition method.

FIG. 4 shows an example of a spatial arrangement of measured scanning points. In this example, the scanning point S(i) (i=0 to 360) is measured at every angular degree θ=0.5 degree in an angular area 0 to 180 degrees by the scanning point acquisition unit 12a. The scanning points S(i) are grouped following to a predetermined rule which will be described later, and specific groups among of them constitute a scanning segment vectors SSV(i,j) representing the planar obstacle. Hereupon, arguments such as i and j are integer numbers, and, it is assumed that the size of the arguments represent an order of measurement of the scanning points in time series in the following description.

For example, the scanning points S(1) to S(4) constitute a scanning segment vector SSV(1, 4). In addition, the scanning points S(i) to S(i+6) except the scanning point S(i+4) constitute a scanning segment vector SSV(i, i+6). The scanning point S(i+4) and scanning points $S_{UN}$ surrounded by a broken line G are the scanning points belonging to a group excluded from a group constituting the scanning segment vectors SSV.

Hereupon, the element vectors V are described. Each of the element vectors V is a vector which constitutes a scanning segment vector SSV by being composed with other element vectors, and the scanning points S are used as a start point and an end point. Therefore, each scanning point S constituting the scanning segment vector SSV forms the element vector V. On the other hand, each scanning point $S_{UN}$ constituting no scanning segment vector SSV, such as the scanning point S(i+4) forms no element vector V. In addition, the element vector V can be formed with two scanning points S which are not necessarily continued in time series other than continued two scanning points S in time series. For example, when the planar obstacle is discontinuous such as a barrier, it is considered that the scanning point S(i+4) corresponds to a point on an obstacle which reflects the laser beam through apertures disposed other side of the planar obstacle.

Figure 5A:
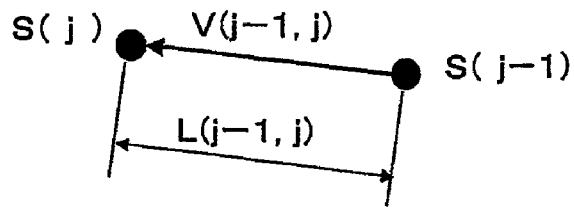
FIG. 5A is an explanation diagram showing an element vector V in the above planar obstacle recognition method.

Subsequently, steps and rules to form the scanning segment vector SSV from the scanning points S are described. FIG. 5A shows an element vector V(j−1, j) which is defined by two scanning points S(j−1) and S(j). A direction of the element vector V goes to the scanning point S(j) acquired later from the scanning point (j−1) acquired earlier by scanning. In addition, in order to regard a vector defined by two scanning points S as an element vector, it is necessary to satisfy a condition that a distance between the two scanning points S, that is, a length L(j−1, J) of the vector is equal to or shorter than the first predetermined length ML. The element vector V is formed by the element vector formation unit 14a provided in the self location recognition unit 14.

Figure 5B:
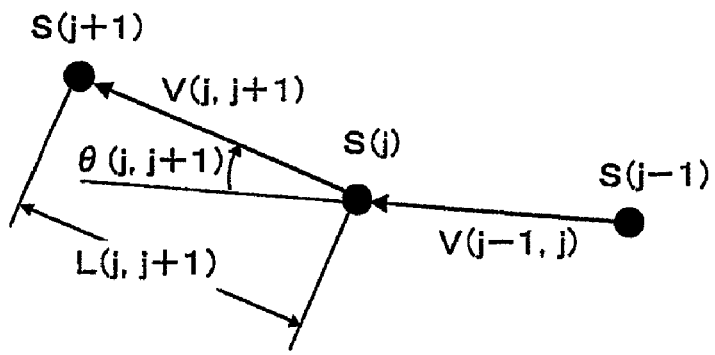
FIG. 5B and FIG. 5C are explanation diagrams showing composition of the element vectors V.

FIG. 5B shows a state to define a new element vector V(j, j+1) by composing a scanning point S(j+1) to the above element vector V(j−1, j) of statement above. In this case, it is necessary to satisfy the conditions that the length of the new element vector V(j, j+1) is equal to or shorter than the first predetermined length ML, and an angle θ (j, j+1) of the element vector V(j, j+1) against a continued another element vector V(j−1, j) is equal to or smaller than the first predetermined angle M θ

Figure 5C:
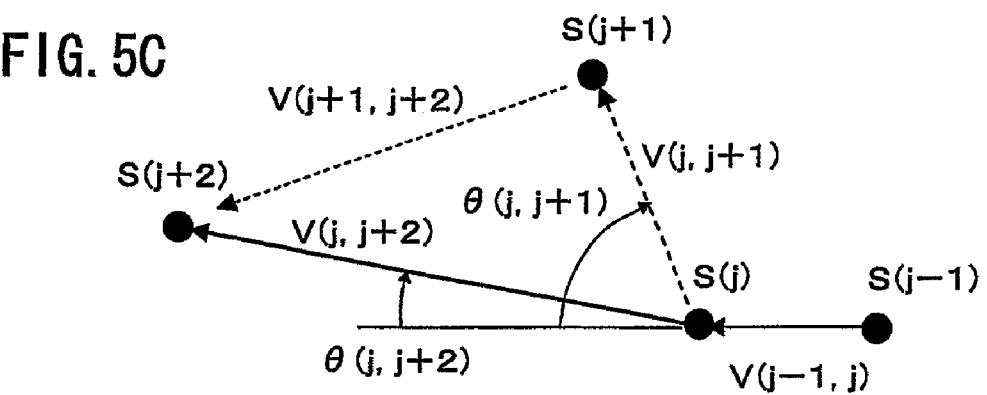

FIG. 5C shows a state that an angle θ(j, j+1) of a vector defined by a scanning points S(j) and S(j+1) against a continued element vector V(j−1, j) is larger than the first predetermined angle M θ, and thereby, the scanning point S(j+1) is excluded from points for forming the element vector. In that case, next scanning point S(j+2) is used for forming an element vector V(j, j+2).

Selection of such element vector V is performed by the element vector selection unit 14b provided in the self location recognition unit 14.

Figure 5D:
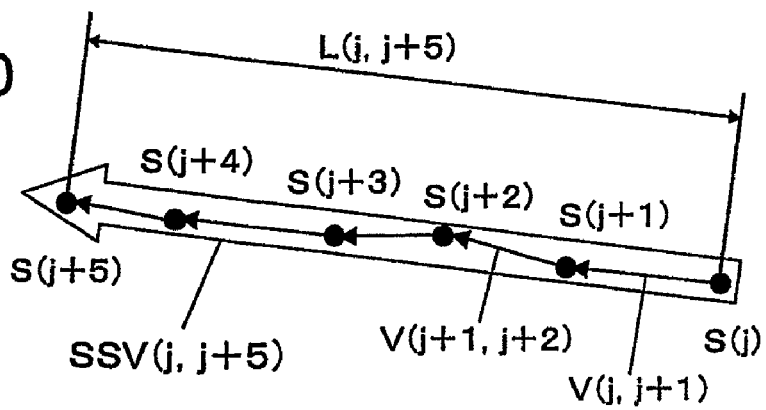
FIG. 5D is an explanation diagram showing a scanning segment vector SSV which is formed by composing a plurality of element vectors.

FIG. 5D shows an example of a scanning segment vector SSV(j, j+5) which is defined when a plurality of element vectors V is continuously formed. Since the scanning segment vector SSV is formed by composition of a plurality of element vectors, a start point of the scanning segment vector SSV is the start point of the first element vector V, and an end point is the end point of the last element vector V. The scanning segment vector SSV can be defined by such two scanning points S(j) and S(j+5), even though a skipped scanning point $S_{SK}$ is existed among the scanning points S forming the composed element vectors V.

Since the planar obstacle is aimed to be represented by the scanning segment vector SSV, it is desirable to establish limits in the composition of vectors with assumption of shapes of the planar obstacles actually exist. Therefore, for example, when the scanning segment vector SSV is formed by composition of a plurality of element vectors V, an angular restriction is established. When an amount of deflection angles Σθ, wherein each deflection angle is formed between two adjoining element vectors, is equal to or smaller than the second predetermined angle M Σθ, the composed vector can be regarded as the scanning segment vector SSV. The amount of deflection angles Σθ can be acquired by adding the deflection angles between each two element vectors V included in the scanning segment vector SSV with positive and negative codes. Such a restriction is assumed for continuous planar obstacle.

In addition, a scanning segment SS is defined by a scanning segment vector SSV under a predetermined restriction. In other words, when a segment defined by a start point and an end point of a scanning segment vector SSV is equal to or longer than the second predetermined length TL0, a scanning segment SS can be defined by this segment. After a plurality of scanning segment vectors SSV are finally formed from a lot of scanning points S, a specific one is extracted from these scanning segment vectors SSV, and a scanning segment SS having a length equal to or longer than the second predetermined length is obtained. Extraction of such a scanning segment SS is performed by the obstacle recognition unit 14d provided in the self location recognition unit 14.

The obstacle recognition unit 14d further serves as a segment collation unit, which collates the scanning segment SS with map segments of an aggregation of segments of planar obstacles in the map information, specifies the positions of the planar obstacles on the map and further specifies the self location of the autonomous vehicle 1. In this way, by previously memorizing the positions of the planar obstacles as environment information on the map, it is possible to specify the positions of the planar obstacles precisely by simple processes such as collation of the scanning segment SS with the map segments. Furthermore, since the self location of the autonomous vehicle 1 can be specified precisely, the autonomous vehicle 1 can be autonomously moved effectively and safely.

Subsequently, the extraction of the scanning segment SS is described in detail with reference to a flowchart shown in FIG. 6. In the extraction processes described here, skipping of the scanning point S is not performed for forming the element vectors V. The process with skipping the scanning point S will be described later.

The extraction of the scanning segment SS is started to prepare the scanning points S(i) (i=0, 1, . . . n) consists of a number of (n+1) points acquires by the scanning point acquisition unit 12a (#11). First, a start point of the scanning segment vector SSV is assumed as the first scanning point S(O), and a number "m" of the scanning point S(m) which is the start point of the scanning segment vector SSV is initialized as m=0 (#12). Hereupon, when the scanning point S(O) forms no element vector V, the number "m" will be renewed in sequence. In that context, the number "m" is an assumed number of the start point, so that the number "m" will be fixed when the scanning segment SS including the assumed start point is defined.

Subsequently, a parameter of integrated deflection angles $\Sigma\theta$ and a vector composition point number "j" are respectively initialized (#13). As mentioned above, the parameter of integrated deflection angles $\Sigma\theta$ is a parameter for adding the deflection angles between each two element vectors V with positive and negative codes. The vector composition point number "j" designates a number of a scanning point S(j) at which two continued element vectors V(j−1, j) and V(j, j+1) are composed, as shown in FIG. 5B. At this time, m=0, and j=m+1, so that j=1. In other words, second scanning point S(1) corresponds to the vector composition point.

Subsequently, a first element vector Va having scanning points S(j−1) and S(j) as a start point and an end point is formed (#14). At this time, since j=1, the start point and the end point of the first element vector Va respectively correspond to the scanning points S(0) and S(1). In the following process, since two element vectors are composed, one is called the first element vector Va, and the other is called a second element vector Vb.

Subsequently, it is examined whether a length of the first element vector Va is equal to or shorter than the first predetermined length ML or not (#15). When an absolute value of the vector |Va| is equal to or shorter than the first predetermined length ML (|Va|≦ML) (YES in step #15), this element vector Va is maintained, and a scanning segment SSV is initialized as a next step of the vector composition (#18). In other words, it is assumed that the scanning segment vector SSV=Va.

When the length of the first element vector Va is longer than the first predetermined length ML, that is, |Va|>ML (NO in step #15), it is examined whether any scanning point S exists or not, by which an element vector V can be formed and the formed element vector V can be composed (#16). When such a scanning point S does not exist (NO in step #16), the extraction process of the scanning segment SS will be completed. On the other hand, when such a scanning point S exists (YES in step #16), the number "m" of the scanning point S(m) which corresponds to the start point of the current scanning segment vector SSV is discarded, and newly m=j is set (#17). Subsequently, the above mentioned process is repeated from step #13.

After the scanning segment vector SSV is initialized in step #18, the second element vector Vb is formed (#19), and a deflection angle θ of the second element vector Vb against the first element vector Va is obtained with using a scalar product and an absolute value of the vector (#20). Subsequently, it is examined whether the deflection angle θ is equal to or smaller than the first predetermined angle M θ or not (#21). When the deflection angle θ is equal to or smaller than the first predetermined angle M θ (YES in step #21), a length |Vb| of the second element vector Vb is examined (#22). When the length |Vb| of the second element vector Vb is equal to or shorter than the first predetermined length ML (|Vb|≦ML) (YES in step #22), the first element vector Va and the second element vector Vb are composed, and the scanning segment vector SSV is renewed (#23). Subsequently, addition of the deflection angles θ is performed (#24).

Subsequently, the integrated value of the deflection angles $\Sigma\theta$ is compared with the second predetermined angle M $\Sigma\theta$ (#25). When the integrated value of the deflection angles $\Sigma\theta$ is equal to or smaller than the second predetermined angle M $\Sigma\theta$ (YES in step #25), composition of the element vector V to the scanning segment vector SSV is completed. Hereupon, when another scanning point S exists (YES in step #26), it proceeds to next vector composition process. Specifically, the second element vector Vb which is newly composed to the scanning segment vector SSV is replaced to the first element vector Va (#31), and the vector composition point number "j" is increased by one, that is, j=j+1 (#32). Subsequently, the above mentioned process is repeated from step #19.

When any one of the above mentioned conditions is not satisfied (NO in one of steps #21, #22, #25 and #26), the vector composition is stopped and it proceeds to step #27. At this time, the start point and the end points of the scanning segment vector SSV respectively correspond to the scanning points S(m) and S(j). Subsequently, it is examined whether the length |SSV(m, j)| of the scanning segment vector SSV (m, j) is equal to or longer than the second predetermined length TL0 or not (#28). When the length |SSV(m, j)| of the scanning segment vector SSV(m, j) is equal to or longer than the second predetermined length TL0 (YES in step #28), a scanning segment SS(m, j) is extracted from the scanning segment vector SSV(m, j) (#29).

Hereupon, the scanning segment SS is a segment defined by two scanning points S(m) and S(j), and it is expressed as a symbol SS(m, j) in this description, conveniently.

When the length |SSV(m, j)| of the scanning segment vector SSV(m, j) is shorter than the second predetermined length TL0 (NO in step #28), the scanning segment SS(m, j) cannot be extracted from the scanning segment vector SSV(M, j), so that it proceeds to step #30. For example, when the scanning segment vector SSV(M, j) is formed by composition of only two element vectors V as an extreme case, since the length |SSV(m, j)| of the scanning segment vector SSV(m, j) is too short, it cannot be regarded that the scanning segment SS extracted from the scanning segment vector SSV represents the planar obstacle.

In step #30, a number of remained scanning points S is examined. If a number of scanning points S which are necessary for performing the vector composition is not remained (NO in step #30), extraction of the scanning segment SS is completed. On the other hand, when a number of scanning points S which are necessary for performing the vector composition is remained (YES in step #30), it proceeds to step #17. In step #17, the number "j" of the scanning point S which is examined last is set to be the number "m" of a start point of a new scanning segment vector SSV. Subsequently, the above mentioned process is repeated from step #13.

Subsequently, extraction of the scanning segment SS with skipping the scanning point S while the element vectors V are formed is described in detail with reference to a flowchart shown in FIG. 7. In the extraction process described here, the skipping of the scanning point S is allowed to a predetermined times MK. In the example shown in FIG. 4, the scanning point S(j+4) is skipped. The, an element vector which skipped once is formed by the scanning points S(i+3) and S(i+5).

Figure 6:
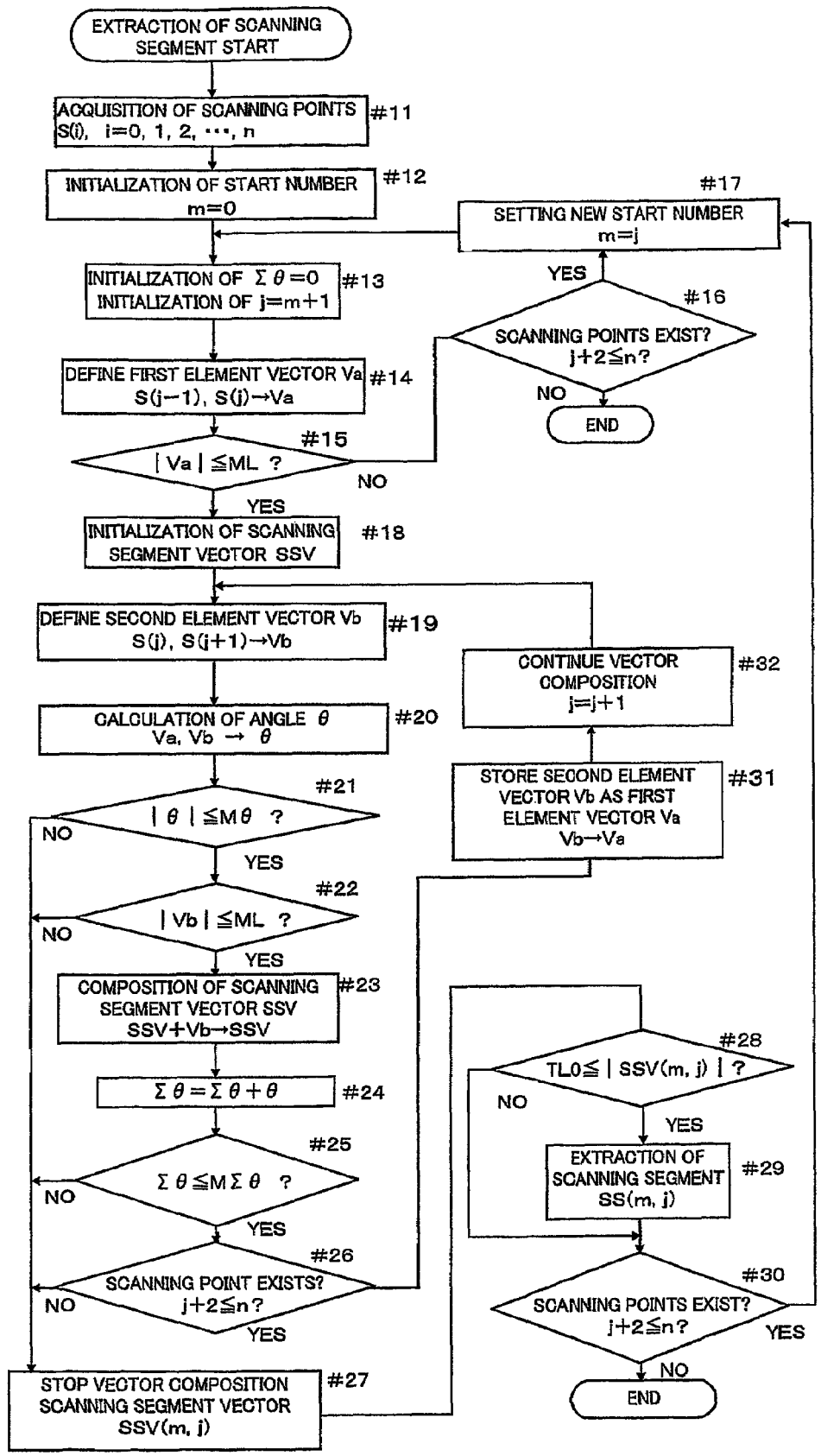
FIG. 6 is a flowchart showing steps of the above planar obstacle recognition method in case that skip of scanning point is not performed.
Figure 7:
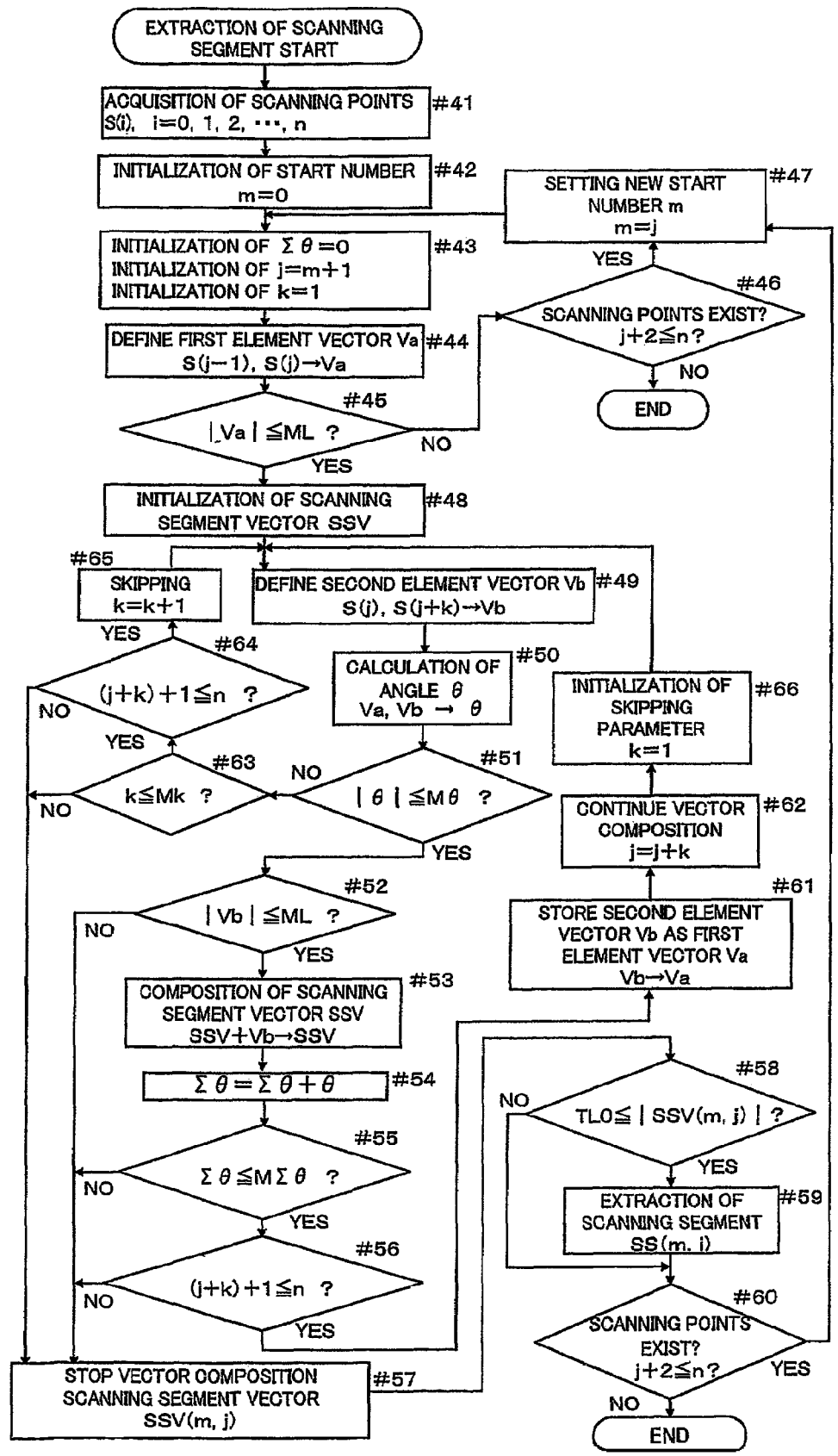
FIG. 7 is a flowchart showing steps of the above planar obstacle recognition method in case that skipping of scanning point is performed.

Since the flowchart shown in FIG. 7 is similar to the flowchart shown in FIG. 6 except the process with respect to the skipping of the scanning point, only the different points between them are described but the description of the overlapped points are omitted. In the process of the flowchart shown in FIG. 7, a skipping parameter "k" is introduced for counting the number of skipping of the scanning point S. The skipping parameter "k" is initialized in step #43.

Subsequently, steps #44 to #50, which are substantially the same as those in the flowchart shown in FIG. 6 without skipping of the scanning points S, are performed, and the deflection angle θ of the element-vector V is examined (#51). Hereupon, even when the deflection angle θ is larger than the first predetermined angle M θ, the composition of the vectors is not stopped immediately, but it is attempt to use a next scanning point S as an end point of the element vector V, differently from the case of skipping no scanning point S (#63, #64 and #65). Then, it proceeds to step #49.

A number of skipping times is examined in step #63, and existence or nonexistence of the scanning point S is examined in step #64, and the skipping parameter "k" is incremented (renewed) in step #65. In step #49, since a number of the scanning point S(j+k) defining the end point of the second element vector Vb, that is, the argument becomes j+k, it is found that the skipping of the scanning points S is performed (k−1) times (if k=2, the skipping is performed once).

In the flowchart shown in FIG. 7, the steps where the skipping parameter "k" is used are different from those in the flow chart show in FIG. 6. For example, the number of next vector composition point becomes (j+k) in step #62. When k=1, no scanning point S is skipped, and when k=2, the scanning point S is skipped once. In addition, the skipping parameter "k" is initialized in step #66 after step #62.

Subsequently, the process in step #47 is described. Although the skipping parameter "k" is not concerned to the process in step #47, a number "m" of a scanning point S(m) which is a start point of a new scanning segment vector SSV is set as m=j for newly starting the vector composition process. Since it is assumed that the scanning point S(j) of the last vector composition point number "j" exists at a corner portion where two planar obstacles are crossed, the number "j" of the last vector composition point at the time in step #47 is set to be the number of start point "m" of the next scanning segment vector SSV.

Figure 8:
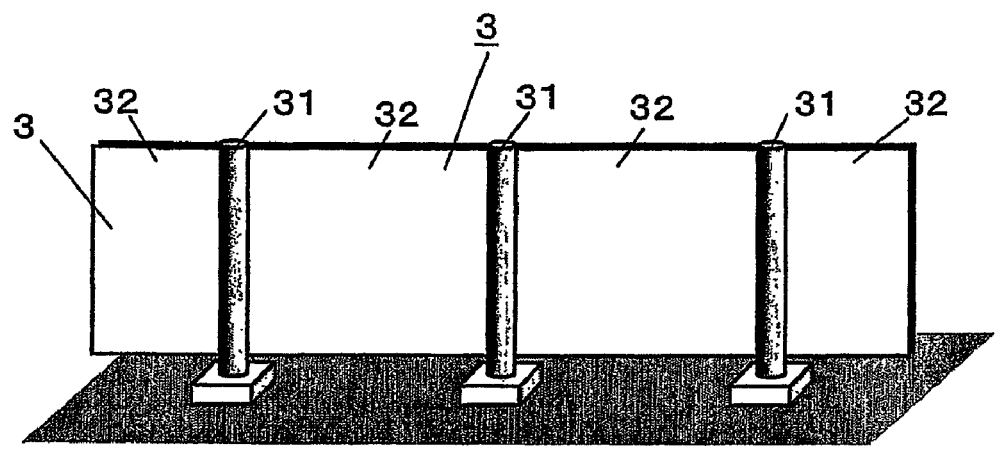
FIG. 8 is a perspective view showing a wall having pole braces as an example of the planar obstacle.
Figure 9A:
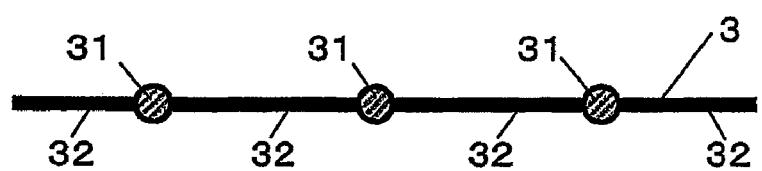
FIG. 9A is a plain view of the wall having pole braces shown in FIG. 8.
Figure 9B:
FIG. 9B is a diagram showing scanning segment vectors SSV representing the wall having pole braces.
Figure 9C:
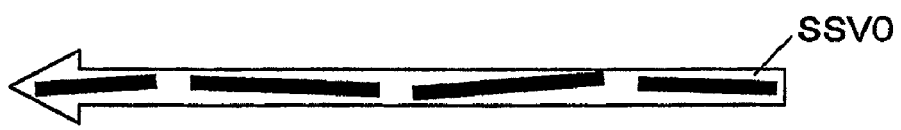
FIG. 9C is a diagram showing a long scanning segment vector SSV0 formed by composition of a plurality of scanning segment vectors SSV.
Figure 10:
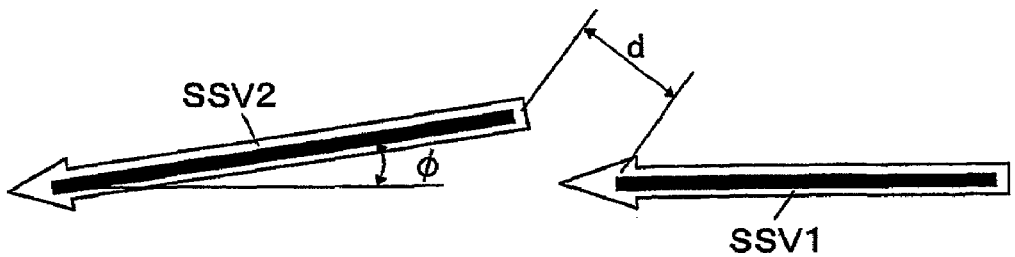
FIG. 10 is an explanation diagram showing conditions with which a plurality of scanning segment vectors SSV can be composed.

Subsequently, an example of composition of a plurality of scanning segment vectors SSV is described with reference to FIGS. 8, 9A to 9C and 10. As shown in FIG. 8, a fence 3 in which main boards 32 are provided between pole braces 31 is assumed as an example of the planar obstacle from which the scanning points S are acquired. Such a fence 3 has a structure that the pole braces 31 are partially protruded from a plane (the main boards 32) as shown in FIG. 9A. Thus, when the scanning segment vectors SSV are formed from the scanning points S acquired by scanning the fence 3 by, for example, a laser radar, the scanning segment vectors SSV are separated at portions of the pole braces 31, as shown in FIG. 9B.

Then, a plurality of scanning segment vectors SSV are composed in a scope satisfying predetermined conditions, so that a large scanning segment vector SSV0 is newly formed. The conditions for composing the scanning segment vectors SSV are described with reference to FIG. 10. An angle φ formed between two scanning segment vectors SSV1 and SSV2 selected among a plurality of scanning segment vectors SSV obtained from the scanning points S is equal to or smaller than a second predetermined angle. A distance between a start point of one scanning segment vector SSV2 and an end point of the other scanning segment vector SSV1 is equal to or shorter than a predetermined distance. When these two conditions are satisfied, two scanning segment vectors SSV1 and SSV2 are composed as a new scanning segment vector SSV by composing a vector from the end point to the start point.

In this way, one long scanning segment vector SSV0 can be formed by composition of a plurality of scanning segment vectors SSV, so that it is possible to extract a longer scanning segment SS0. As a result, the planar obstacle can be recognized more precisely, and the self location of the autonomous vehicle 1 can be specified more precisely.

Figure 11:
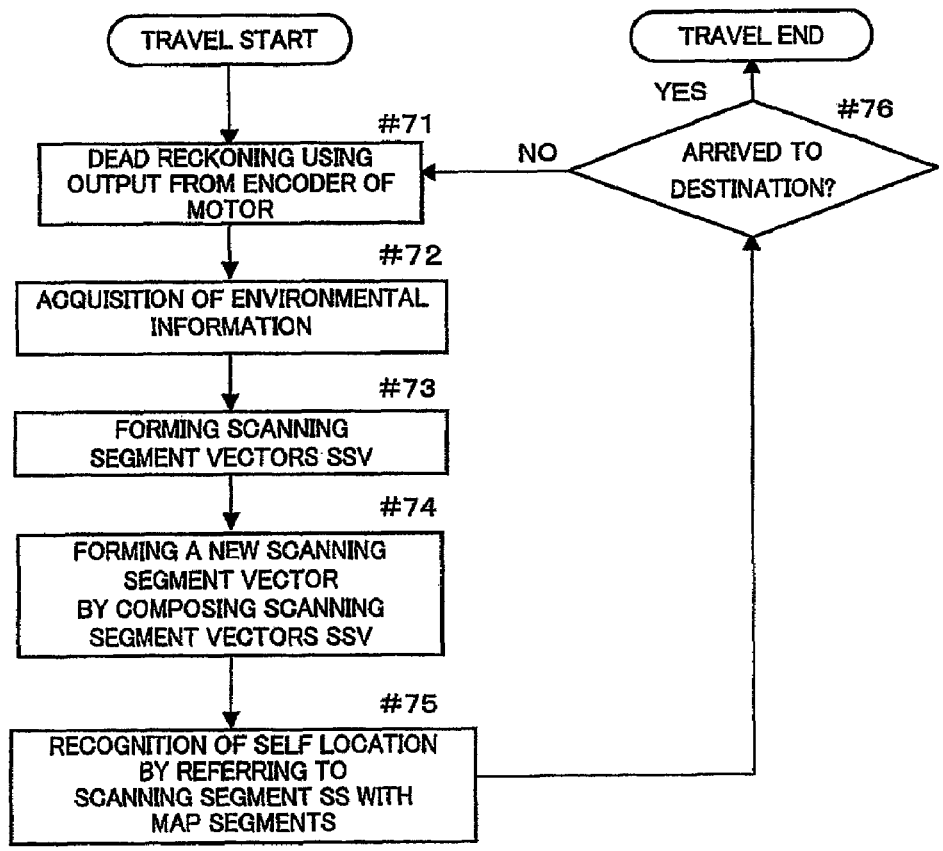
FIG. 11 is a flowchart of an autonomous travel of the autonomous vehicle with using the planar obstacle recognition method of the present invention, including steps of composition of scanning segment vectors.

Subsequently, a flowchart of the autonomous travel of the autonomous vehicle 1 which performs the above mentioned processes is shown in FIG. 11. The flowchart shown in FIG. 11 is similar to the flowchart shown in FIG. 2 except the addition of composition process of the scanning segment vectors SSV in step #74. Thus, detailed description of the flowchart shown in FIG. 11 is omitted.

Subsequently, a formation of a scanning segment vector SSV with respect to a planar obstacle having apertures is described with reference to FIGS. 12, and 13A to 13C. As for the operation area of the autonomous vehicle 1, outdoor site of a factory, a play ground, or a theme park is assumed other than indoor such as a hospital or a manufacturing plant. In such an outdoor operation area, a fence 30 having main frames 32 such as metallic meshes having a large transmission factor (or air gaps) between pole braces 32 as shown in FIG. 12 is provided as a bounder of a running path. Then, the fence 30 existing in the operation area is previously memorized as a planar obstacle having apertures in the map segments into the memory 11 of the autonomous vehicle 1. As mentioned above, the map segments are aggregation of segments representing the planar obstacles in the map information.

As shown in FIG. 13A, a cross section of the fence 30 has portions corresponding to the pole braces 31 which shield or reflect laser beams emitted from the laser radar, and portions corresponding to the main frames 32 which permit to penetrate most of the laser beam. When the fence 30 comprised of a plurality of pole braces 31 and the main frames 32 provided between the pole braces 31 is scanned in a substantially horizontal plane by the scanning point acquisition unit 12a including the laser radar, reflected waves mainly reflected by the pole braces 31 are received by the scanning point acquisition unit 12a. As a result, position coordinates of points on the pole braces 31, the main frames 32 and objects 36 behind the fence 30 are acquired as the scanning points S. The scanning points S becomes an aggregation of the points distributed at positions corresponding to these objects, as shown in FIG. 13B.

The element vector formation unit 14a of the self location recognition part 14 forms element vectors V(i, i+1), V(i+1, i+3), V(i+3, i+5), V(i+5, i+6) . . . with using the scanning point S(i), S(i+1), S(i+3), S(i+5), S(i+6) . . . of the points on the pole graces 31 and the main frames 32 following to the flow shown in FIG. 7. Furthermore, a scanning segment vector SSV is formed by composition of the element vectors V by the element vector selection unit 14 and the scanning segment vector formation unit 14c.

Still furthermore, the obstacle recognition unit 14d judges whether the scanning segment vector SSV formed as above can be recognized as a planar obstacle or not. When the scanning segment vector SSV can be recognized as the planar obstacle, the obstacle recognition unit 14d refers a scanning segment SS extracted from the scanning segment vector SSV with map segments representing the fence 30 memorized in the memory 11. Thereby, the position of the fence 30 is specified on the map, and the self location of the autonomous vehicle 1 is further specified on the basis of the position of the fence 30.

In this way, even when a ratio of apertures of the main frames 32 is higher, the fence 30 including the main frames 32 can be represented as the scanning segment vector SSV by recognizing the pole graces 31 and the main frames 32 as the scanning points S, and thereby, the scanning segment SS which can be referred with the map segments can be extracted from the scanning segment vectors SSV. In addition, when the position coordinates of the points on the pole braces 31 are selectively acquired as the scanning points S, an ultrasonic sensor which has a lower spatial resolution than that of the laser radar can be used.

Figure 14:
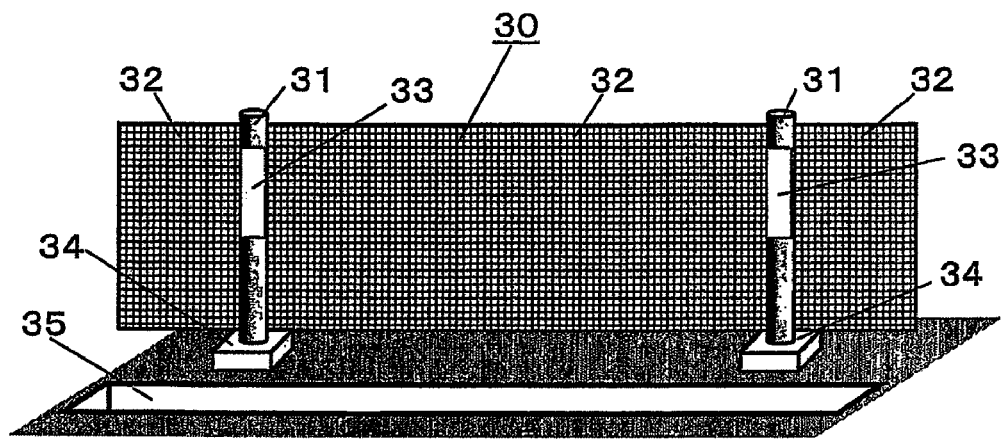
FIG. 14 is perspective view showing an example that reflector marking is adhered on each pole brace of the fence having apertures as another example of the planar obstacle.
Figure 15A:
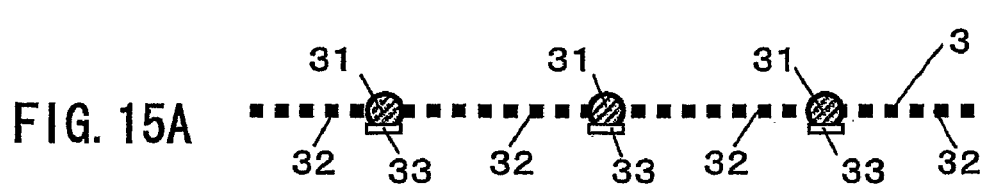
FIG. 15A is a plain view of the fence shown in FIG. 14.
Figure 15B:
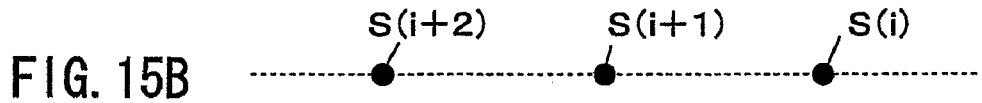
FIG. 15B is a diagram showing scanning points S corresponding to pole braces of the fence.
Figure 15C:
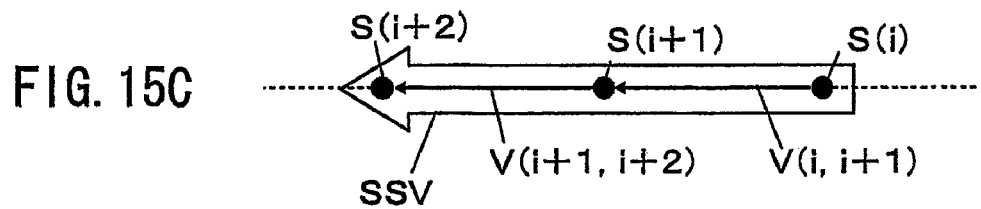
FIG. 15C is a diagram showing element vectors V and a scanning segment vector SSV formed by the scanning points S.

Subsequently, a method for acquiring the positions of the pole braces 31 of the fence 30 as the scanning points more surely is described with reference to FIGS. 14, and 15A to 15C. In this case, reflector markings 33 are previously put on the pole braces 31 of the fence 30 as shown in FIG. 14. FIG. 15A shows a sectional view of the fence 30 and a state of the reflector markings 33. FIG. 15B shows the scanning points S acquired by this method. FIG. 15C shows the element vectors V and the scanning segment vector SSV formed by this method.

When the fence 30 is scanned in a substantially horizontal plane by the laser radar, intensities of the reflected waves reflected by the reflector marking 33 become higher than intensities of the reflected waves reflected by other points, so that it is possible to extract only the scanning points S on the pole braces 31 among a lot of the scanning points S. According to such a method with using the reflector markings 33, the recognition of the pole braces 31, in other words, the recognition of the fence 30 becomes easier.

Subsequently, a case that the scanning points S which are to be processed are limited in a predetermined distance is described with reference to FIGS. 16 and 17. It is possible to reduce a quantity of calculation necessary for forming the scanning segment vector SSV performed by the self location recognition unit 14 by reducing a number of scanning points S acquired by the scanning point acquisition unit 12a, and thereby, the judgment for autonomous travel can be performed more quickly.

Figure 16:
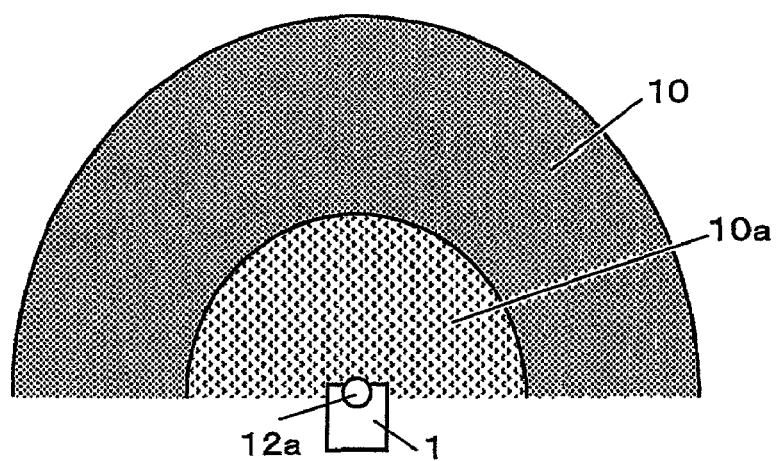
FIG. 16 is a plain view explaining a state that scanning points S which are intended to be processed are limited in a predetermined distance in the planar obstacle recognition method in accordance with the present invention.
Figure 17:
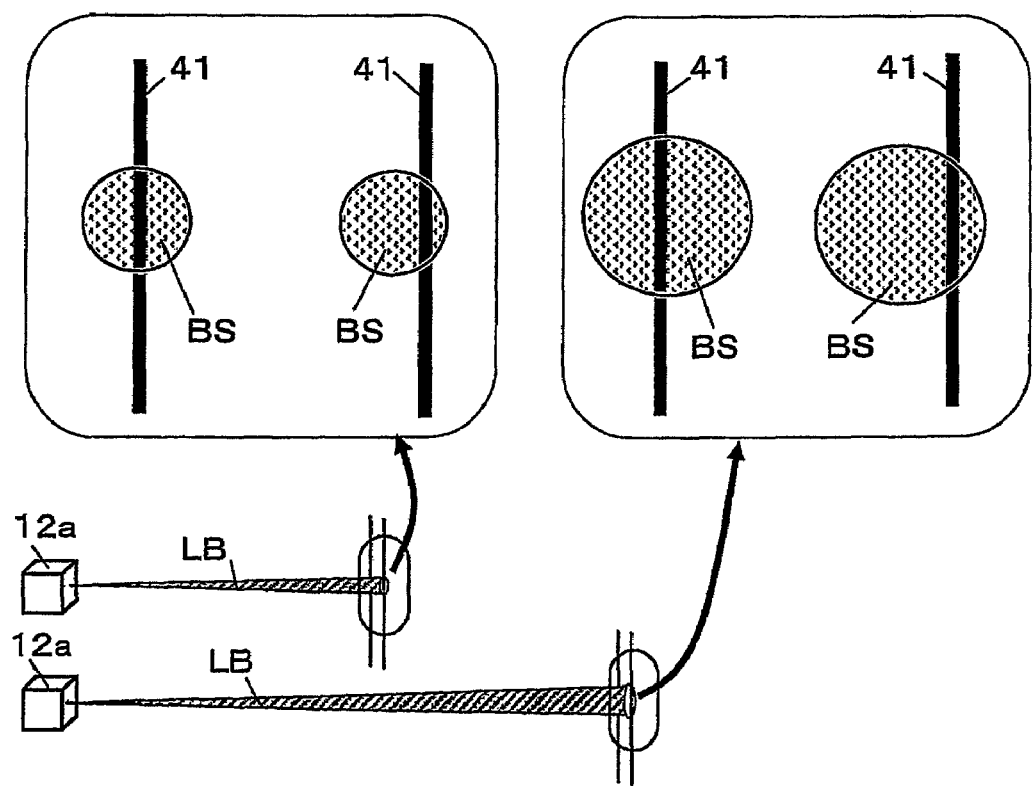
FIG. 17 is an explanation diagram showing a method to limit the scanning points S which are intended to be processed in a predetermined distance with utilizing a phenomenon that a quantity of reflected light of a laser radar varies corresponding to a distance to an object reflecting a light.

As shown in FIG. 16, an area 10a which is within a predetermined distance from the origin (position of the scanning point acquisition unit 12a on the main body of the autonomous vehicle 1) is set in an area 10 in which position coordinate of objects can be measured by the scanning point acquisition unit 12a depending on operation environment of the autonomous vehicle 1. Then, the element vectors V are formed with using only the scanning points in the area 10a.

As for a method for defining such an area 10a, it is possible to utilize a phenomenon that an intensity of reflected wave of a laser beam emitted from the laser radar varies corresponding to a distance to an object. As shown in FIG. 17, dimensions of a beam spot BS is calculated on a basis of a diameter of the beam spot BS of a laser beam LB at a position of a wire 41 with respect to the wire 41 which constitutes a fence located at a position distant a predetermined distance from the scanning point acquisition unit 12a including the laser radar. Subsequently, a ratio of dimensions of the wire 41 occupied in the dimensions of the beam spot BS is calculated. Then, a multiplication of the ratio with an inherent reflectance of a material of the wire 41 is defined as a measurement reflectance against the laser beam of the laser radar. The longer the distance becomes, the larger the dimensions of the beam spot BS becomes in proportion to the square of the distance. The dimensions of the wire 41, however, are increased in proportion to the distance. Consequently, the value of the measurement reflectance becomes smaller depending on the distance. Thus, when a value of the measurement reflectance corresponding to a distance defining the area 10a is set in the scanning point acquisition unit 12a, and a filtering process is performed so as not to receive the reflected waves equal to or lower than the measurement reflectance, it is possible to limit the scanning points S to be processed in a predetermined distance.

Figure 18A:
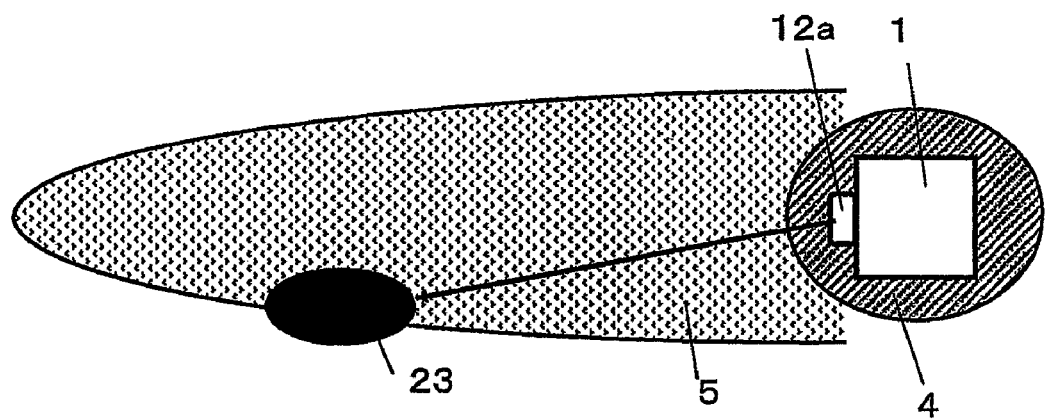
FIG. 18A is a plain view showing a state that the autonomous vehicle normally performs the autonomous travel.

Subsequently, autonomous travel of the autonomous vehicle 1 with recognizing planar obstacles such as a wall or a fence is described with reference to FIGS. 18A and 18B. FIG. 18A shows a state that the autonomous vehicle 1 is autonomously moved with setting a caution area 4 around the autonomous vehicle 1 and an attention area 5 ahead of moving direction. When an obstacle 23 is detected in the attention area 5, the autonomous vehicle 1 reduces the moving speed or outputs a display or an alarm for promoting awareness. Furthermore, the autonomous vehicle 1 is moved so that the obstacle 23 may not intrude into the caution area 4. If the obstacle 23 intrudes into the caution area 4, the autonomous vehicle 1 immediately stops. In this way, the autonomous vehicle 1 can be autonomously moved effectively by setting control areas in phase around itself.

By the way, a side ditch 35 may be formed along the fence 30 or a block 34 may be provided on a root of the pole brace 31 as shown in FIG. 12. Steps due to such a side ditch 35 or a block 34 exists at lower positions near to a road surface of a track, so that these steps cannot be detected by obstacle detection in front horizontal direction. Therefore, an expanded caution area 4a and an expanded attention area 5a are respectively added to the caution area 4 and the attention area 5 around the autonomous vehicle 1 against a specific obstacle 24 such as a wall or a fence as shown in FIG. 18B, so that the autonomous vehicle 1 can be prevented to approach the specific obstacle 24. Thereby, it is possible to prevent the occurrence of trouble such as run off or rollover of the autonomous vehicle 1, thereby enabling the effective autonomous travel.

Figure 18B:
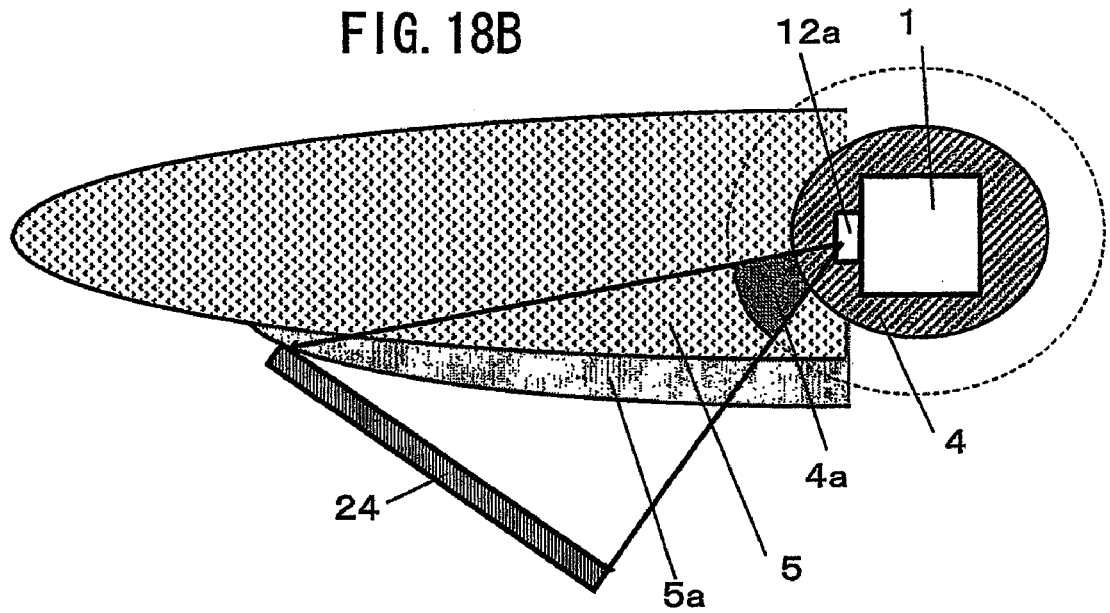
FIG. 18B is a plain view showing a state that an expansion caution area and an expansion attention area are added to a caution area and an attention area around the autonomous vehicle so as not to approach a specific obstacle.

The expanded caution area 4a and the expanded attention area 5a should be set in an inside of a field of view of the specific obstacle 24 as shown in FIG. 18B. In this case, in an area where the specific obstacle 24 is not recognized, the autonomous vehicle 1 can be performed a normal travel motion as shown in FIG. 18A, so that the autonomous vehicle 1 can be moved effectively.

Figures 19A, 19B:
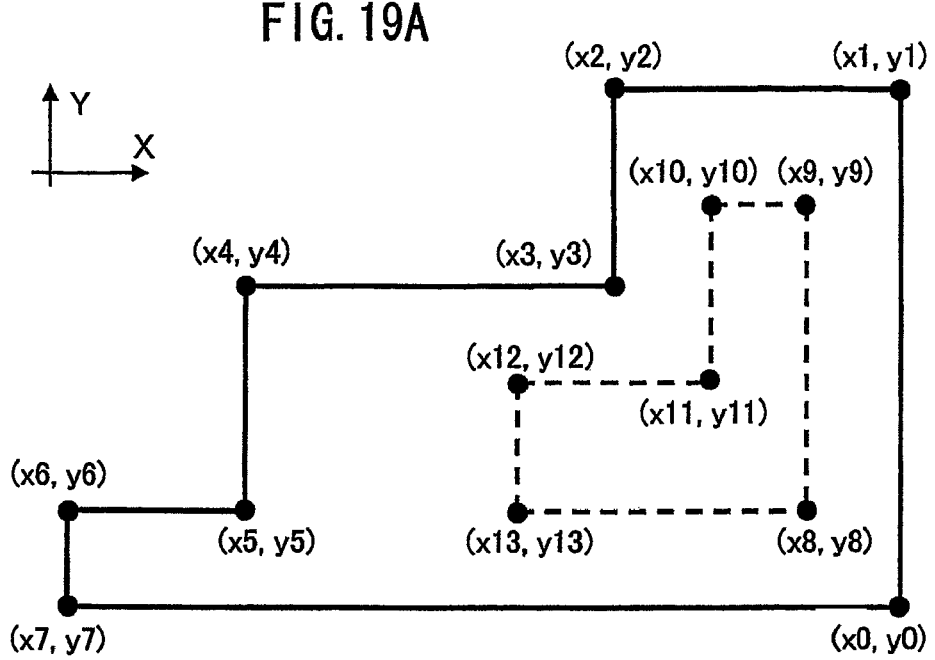
FIG. 19A is a diagram showing an example of arrangement of planar obstacles existing in an operation area of the autonomous vehicle.
FIG. 19B is a table showing an example of map segment data representing the planar obstacles.

Hereupon, a case that a planar obstacle having apertures is assumed as the specific obstacle 24 is described with reference to FIGS. 19A and 19B. FIG. 19A shows a disposition of planar obstacles, and FIG. 19B shows data of map segments corresponding to disposition of the planar obstacles. In FIG. 19A, solid lines show the planar obstacles having no aperture and broken lines show the planar obstacles having apertures. The data shown in FIG. 19B are data of map segments which are an aggregation of segments of the planar obstacles on the map previously memorized in the memory 11. Each map segment is coordinates of a start point and an end point of each planar obstacle detectable by the laser radar. Each map segment further includes an aperture property (existence or nonexistence of aperture) used for distinguishing whether the planar obstacle existing in the operation area has apertures or not. When the planar obstacle has no aperture, the aperture property is set to be "0", and when the planar obstacle has apertures, the aperture property is set to be "1".

When the planar obstacle having apertures is assumed as the specific obstacle 24, recognition of the planar obstacle having apertures effectively and surely enables the autonomous travel of the autonomous vehicle 1 safely and effectively. Thus, the method for extracting the scanning segment SS from the scanning segment vector SSV which represents the planar obstacle such as a wall or a fence is applied.

As for the recognition method of the planar obstacle having apertures, by following the flowchart shown in FIG. 6, element vectors V are formed without skipping scanning points S, and forming a first group of scanning segment vectors $SSV_1$ from a plurality of element vectors V which are selected by predetermined conditions. When the planar obstacle has apertures, as shown by broken lines in FIG. 5C, a deflection angle θ formed between two continuous element vectors V(j−1, j) and V(j, j+1) has a higher probability that it becomes larger than the first predetermined angle M θ, so that a scanning segment vector belonging the first group scanning segment vectors $SSV_1$ is rarely formed with respect to the planar obstacle having apertures.

Subsequently, by following the flowchart shown in FIG. 7, element vectors V are formed with skipping scanning points S arbitrarily, and forming a second group of scanning segment vectors $SSV_2$ from element vectors V which are selected by predetermined conditions. In this case, the scanning point S(j+1), by which the deflection angle θ becomes larger than the first predetermined angle Mθ is skipped as shown by solid lines in FIG. 5C, so that a scanning segment vector belonging to the second group of scanning segment vectors $SSV_2$ is formed with respect to the planar obstacle having apertures.

Subsequently, when the first group of scanning segment vectors $SSV_1$ and the second group of scanning segment vectors $SSV_2$ are compared, the scanning segment vectors corresponding to the planar obstacles having no aperture are contained in both groups $SSV_1$ and $SSV_2$, but the scanning segment having apertures are included in only the second group of scanning segment vectors $SSV_2$. Thus, when the element vectors forming the first group of scanning segment vectors $SSV_1$ are subtracted from the element vectors forming the second group of scanning segment vectors $SSV_2$, a third group of scanning segment vectors $SSV_3$ which are formed by the remained element vectors correspond to the planar obstacles having apertures. By extracting scanning segments SS from a scanning segment vector belonging to the third group of scanning segment vectors $SSV_3$, only the planar obstacles having apertures can be recognized.

Figure 20A:
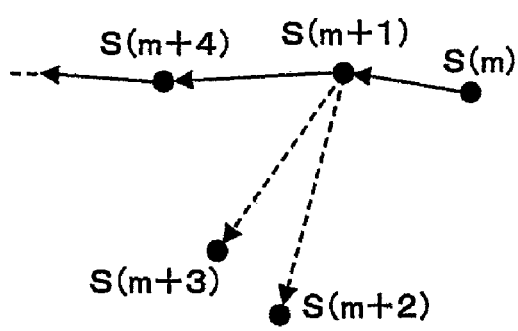
FIGS. 20A to 20C are explanation diagrams respectively showing composition of element vectors in the planar obstacle recognition method in accordance with the present invention.

Subsequently, a method for deciding the first element vector V in the formation of the scanning segment vector SSV is described with reference to FIGS. 20A to 20C which respectively show examples which may occur in the vector composition of the first element vectors. In the example shown in FIG. 20A, the first element vector Va is normally formed with two scanning points S(m) and S(m+1) which are continued in time series, and the second element vector Vb is formed by two scanning points S(m+1) and S(m+4) which are approximate in time series but discontinued with skipping the scanning points S(m+2) and S(m+3). This condition can be processed by the flow shown in FIG. 7 which introduces the skipping parameter "k" with no problem.

Figure 20B:
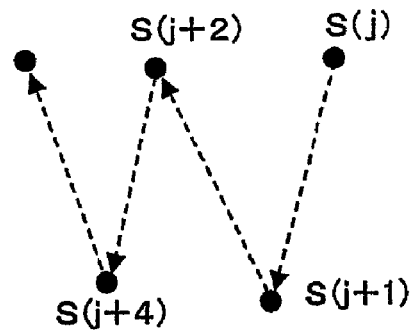

In the example shown in FIG. 20B, there are a rear line constituted by scanning points S(m), S(m+2), S(m+4) . . . and a front line constituted by scanning points S(m+1), S(m+3) . . . . When the scanning points S are arranges as above, the first element vector Va may not be decided by following to the flowchart shown in FIG. 7. Specifically, under the condition shown in FIG. 20, when a first element vector Va is attempt to be formed by the scanning points S(m) and S(m+1), a length of the vector formed by these two continuous scanning points S(m) and S(m+1) in time series becomes longer than the first predetermined length ML. Then, in the flow shown in FIG. 7, another first element vector Va is further attempt to be formed by two scanning points S(m+1) and S(m+2) which are subsequently continued. The length of the vector formed by these two continuous scanning points S(m+1) and S(m+2), however, becomes longer than the first predetermined length ML. When such a circumstance continues, the first element vector Va is not decided. Hereupon, the point is to be missed the fact that the first element vector Va can be formed by, for example, the scanning points S(m) and S(m+2) belonging the same line in FIG. 20B.

Figure 20C:
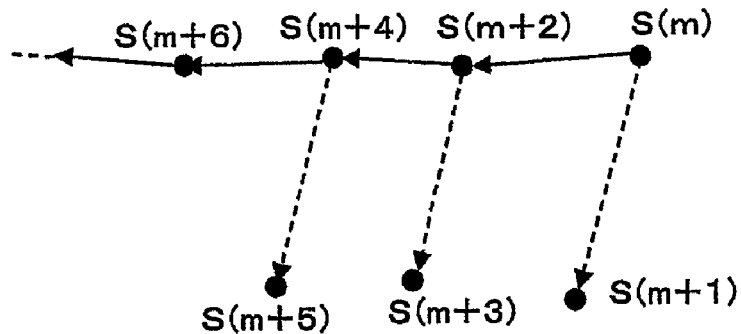

Thus, as shown in FIG. 20C, by skipping the second scanning point S(m+1) which is improper to form the first element vector Va with respect to the first scanning point S(m), the formation of the first element vector Va can be processed by the flow shown in FIG. 7. Then, an initial skipping parameter "p" is introduced in the formation of the first element vector Va so as to enable the skipping of improper scanning points within a predetermined times "p" after the second scanning point. When the first element vector Va cannot be formed although the skipping of the scanning point is repeated by the predetermined times "p", the scanning point which serves as a start point of the first element vector Va is shifted by one, and it is attempt to form the first element vector Va, again.

Figure 21:
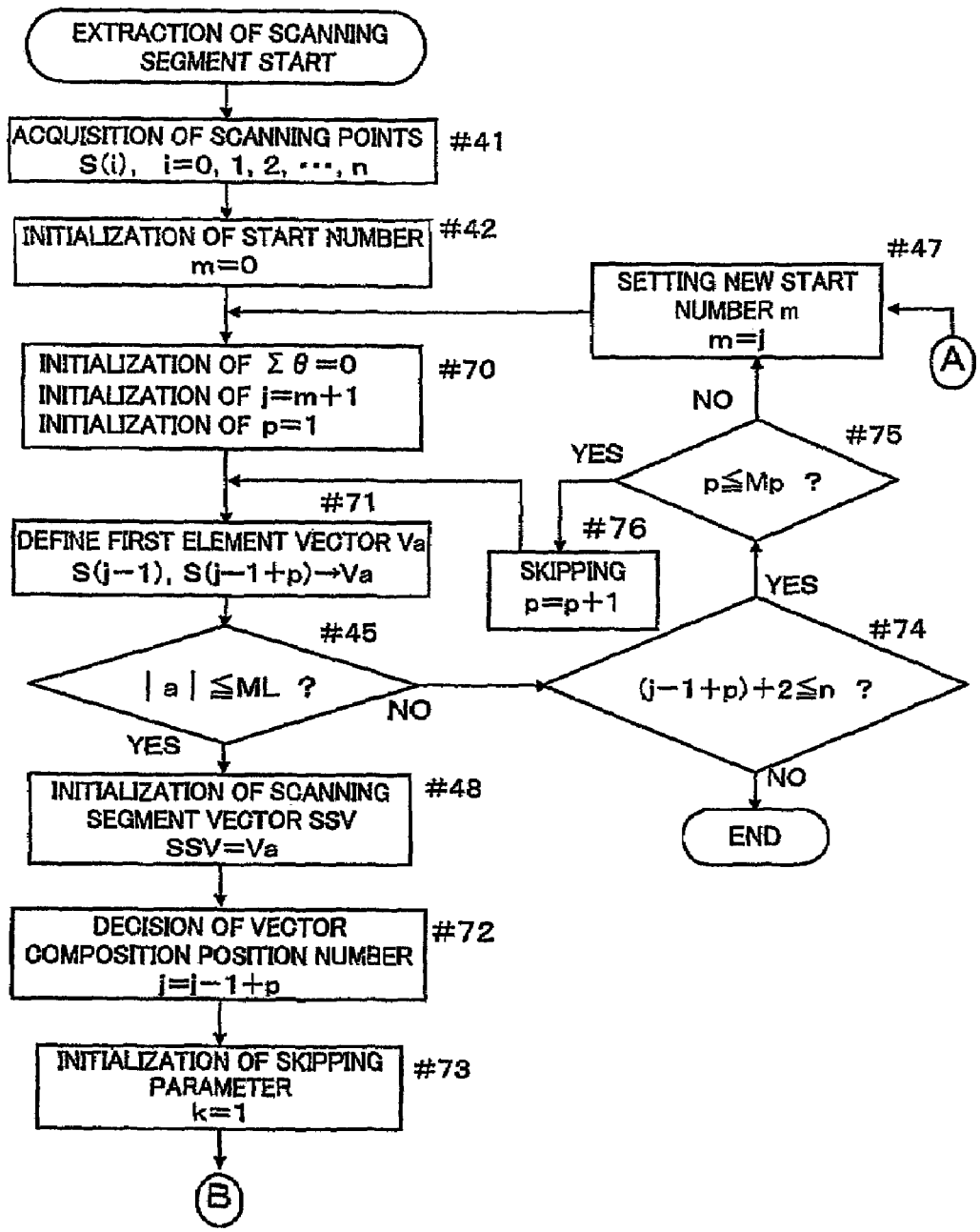
FIG. 21 is a flowchart showing the planar obstacle recognition method in accordance with the present invention, in which skip of the scanning point is considered to form a primary element vector when a scanning segment vector representing a planar obstacle is formed from the scanning points.
Figure 22:
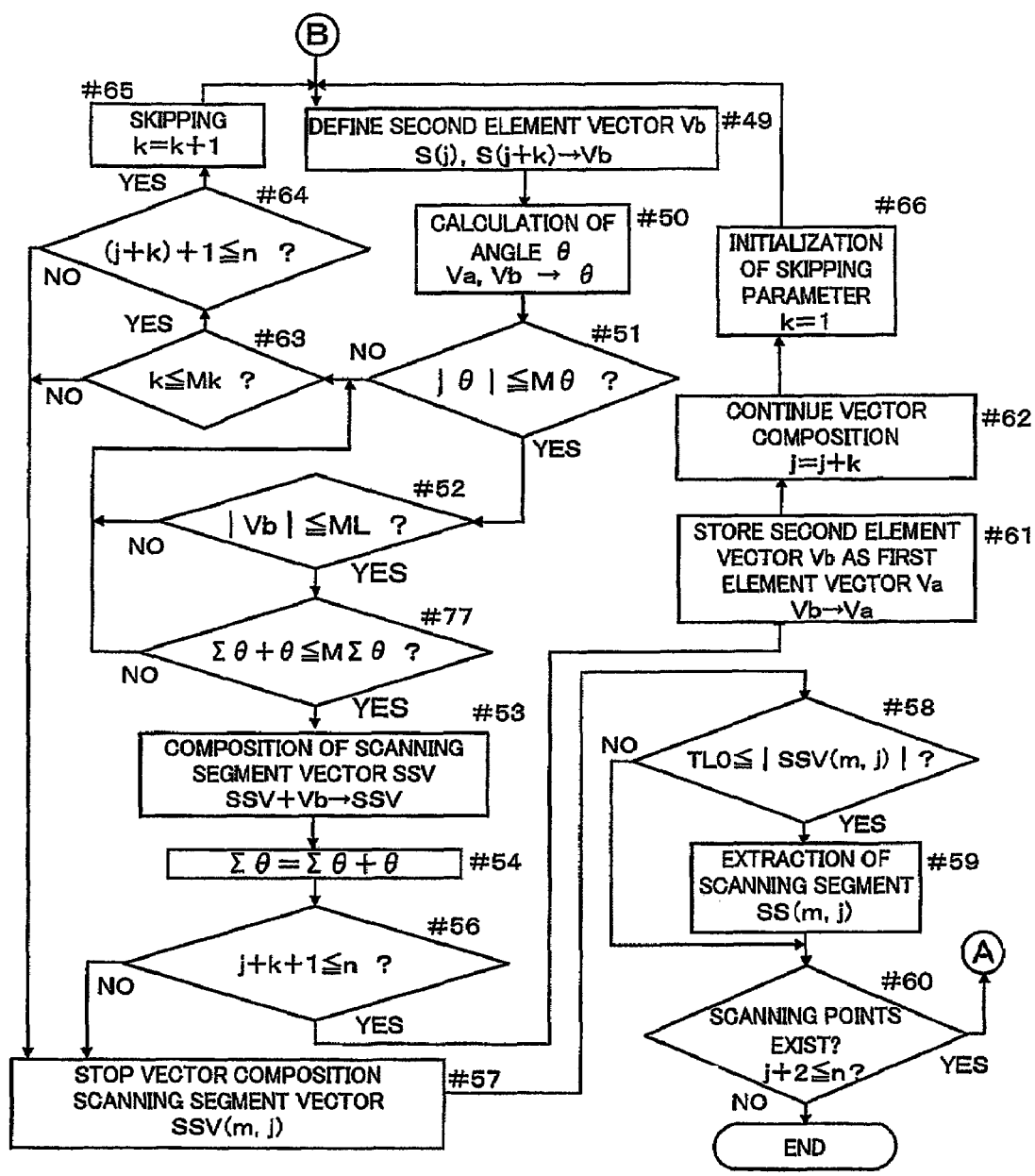
FIG. 22 is a flowchart showing a continuance of the flowchart of FIG. 21.

FIGS. 21 and 22 show a flowchart which can deal with such an instance by introducing the initial skipping parameter "p". The flowchart shown in FIGS. 21 and 22 is similar to the flowchart shown in FIG. 7 except the use of the initial skipping parameter "p", so that only the different points are described, and the description of overlapped portion is omitted.

As shown in FIG. 21, after the number "m" of the scanning point S(m) which serves as a start point of the scanning segment vector SSV is initialized in step #42, the initial skipping parameter "p" is initialized in step #70. Subsequently, the first element vector Va is defined (#71), a length of the first element vector Va is examined (#45). When the length of the first element vector Va is longer than the first predetermined length ML, existence or nonexistence of other scanning point S is examined (#74), and possibility of skipping of the scanning point is examined (#75). When the skipping of the scanning point is possible (YES in step #75), the scanning point is skipped once (#76), and the process is repeated from step #71.

Alternatively, when the skipping of the scanning point is impossible (NO in step #75), new number "m" of the scanning point S(m) serving as the start point of the scanning segment vector SSV is set (#47), and the process is repeated from step #70 of initialization. When the first element vector Va is formed (YES in step #45), the skipping parameter "k" is initialized (#73). Steps shown in FIG. 22 are substantially the same as those shown in FIG. 7 except the following points.

In steps #52 to #55 in the flow shown in FIG. 7, when the length of the second element vector Vb is longer than the first predetermined length ML, or when the integrated value of the deflection angles Σθ is larger than the second predetermined angle M Σθ, the composition of the vectors is stopped. In contrast, in the flow shown in FIG. 22, the composition of vectors is attempted with skipping the scanning point S under the same condition (when NO in step #52 or #77, it proceeds to step #63). By performing the extraction of the scanning segment SS following to the flow shown in FIGS. 21 and 22, the trouble shown in FIG. 20B can be evaded, and the scanning segment vector SSV can be formed by composition of a plurality of element vectors V, as shown in FIG. 20C.

Figure 23:
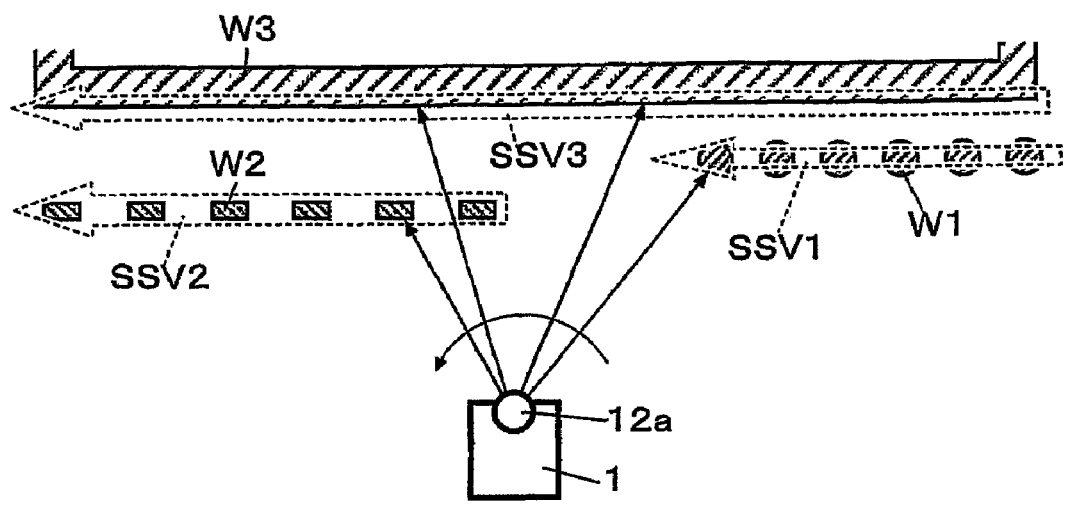
FIG. 23 is a plain view showing dual structure of planar obstacles in which barrier or fence having apertures is provided in front of a wall having no aperture as still another example of the planar obstacle.
Figure 24:
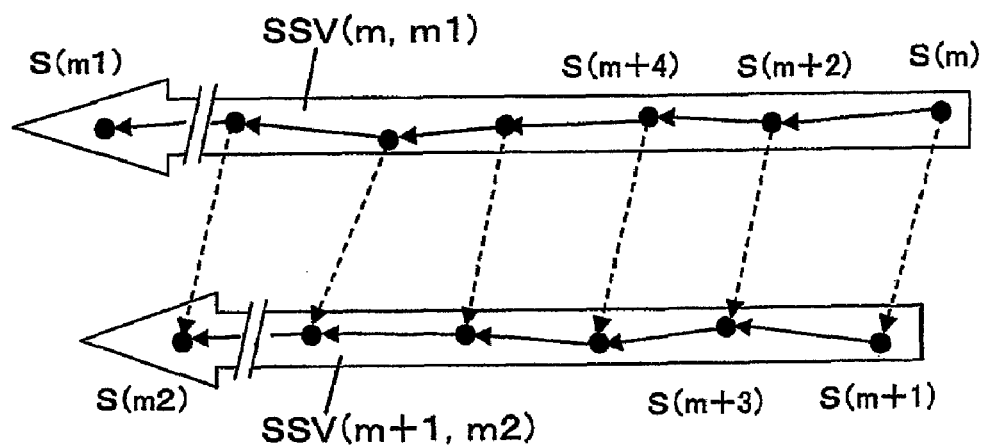
FIG. 24 is a diagram showing a state to form a plurality of scanning segment vectors representing planar obstacles with using scanning points acquired from the dual structure of planar obstacles shown in FIG. 23.
Figure 25:
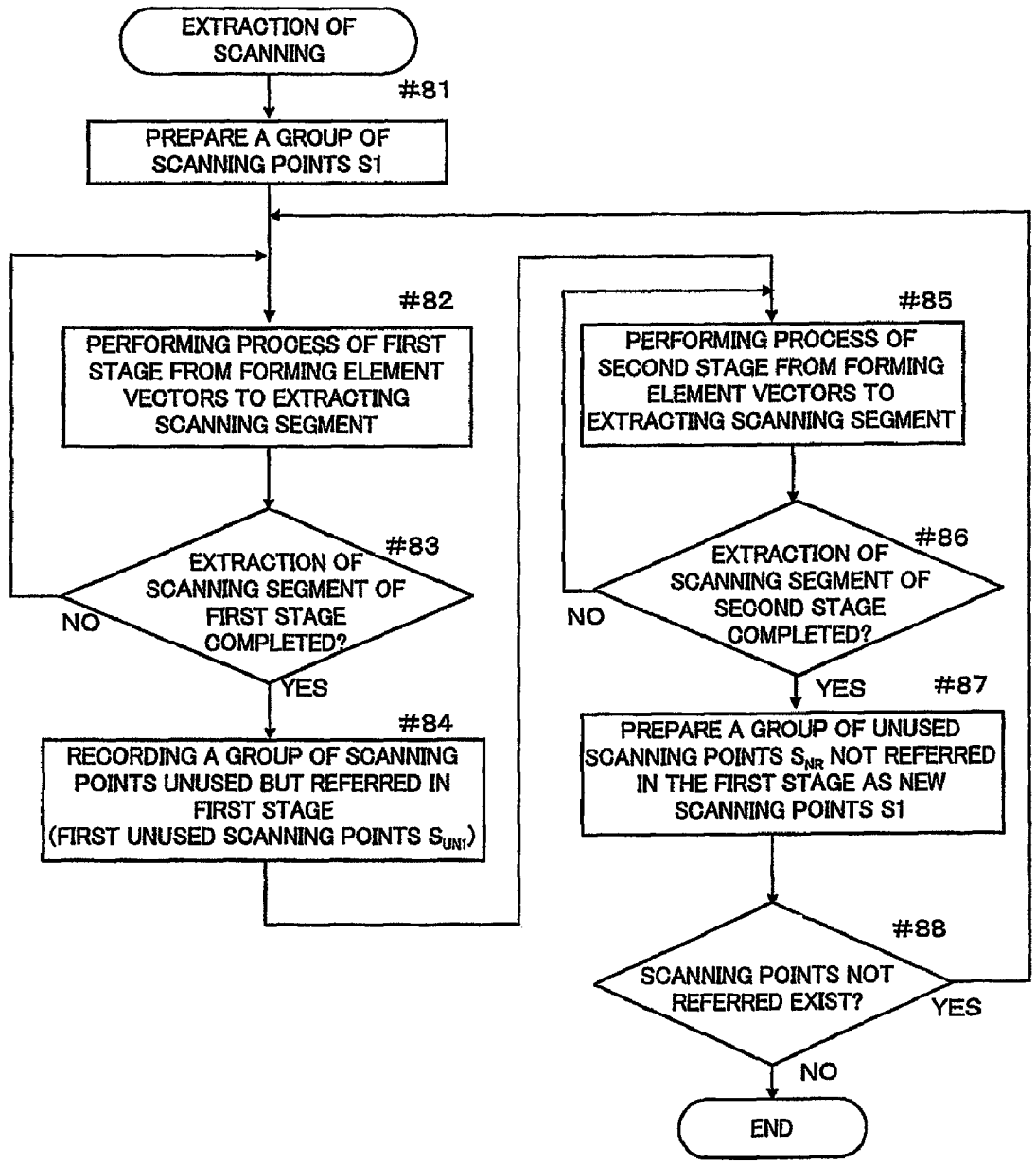
FIG. 25 is a flowchart showing steps to form a plurality of scanning segment vectors representing planar obstacles with using scanning points acquired from the dual structure of planar obstacles shown in FIG. 23.
Figure 26:
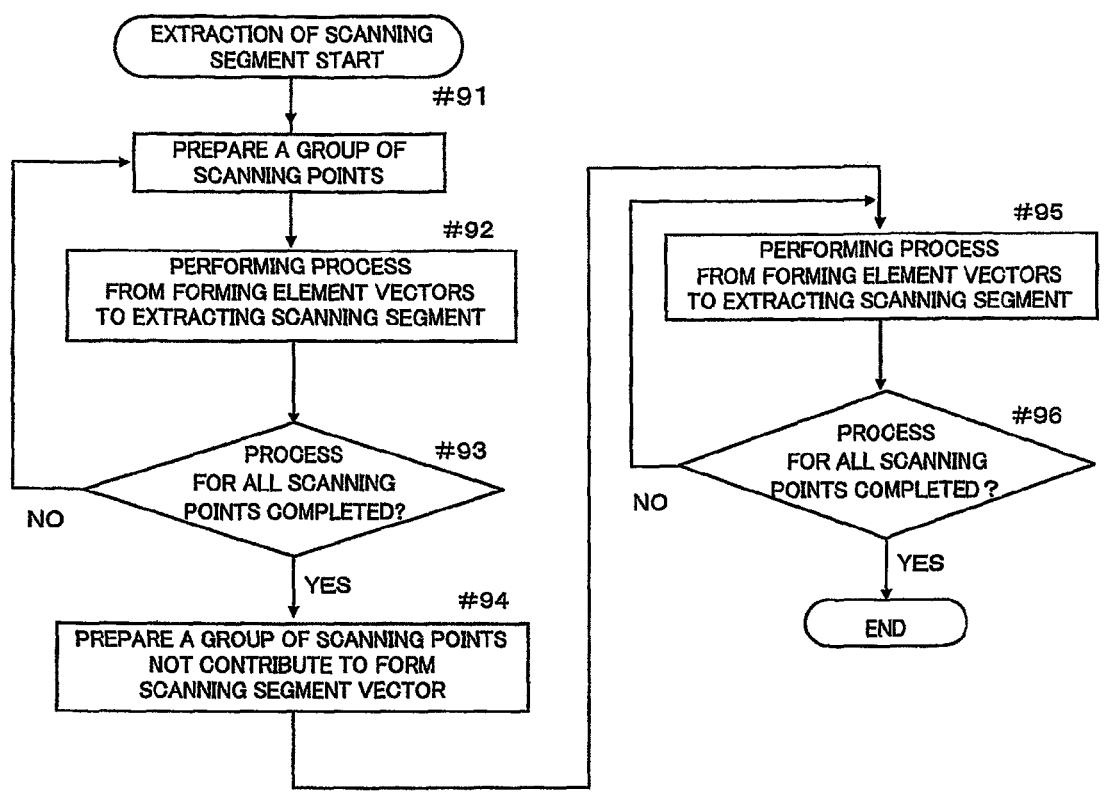
FIG. 26 is a flowchart showing other steps to form a plurality of scanning segment vectors representing planar obstacles with using scanning points acquired from the dual structure of planar obstacles shown in FIG. 23.
Figure 27:
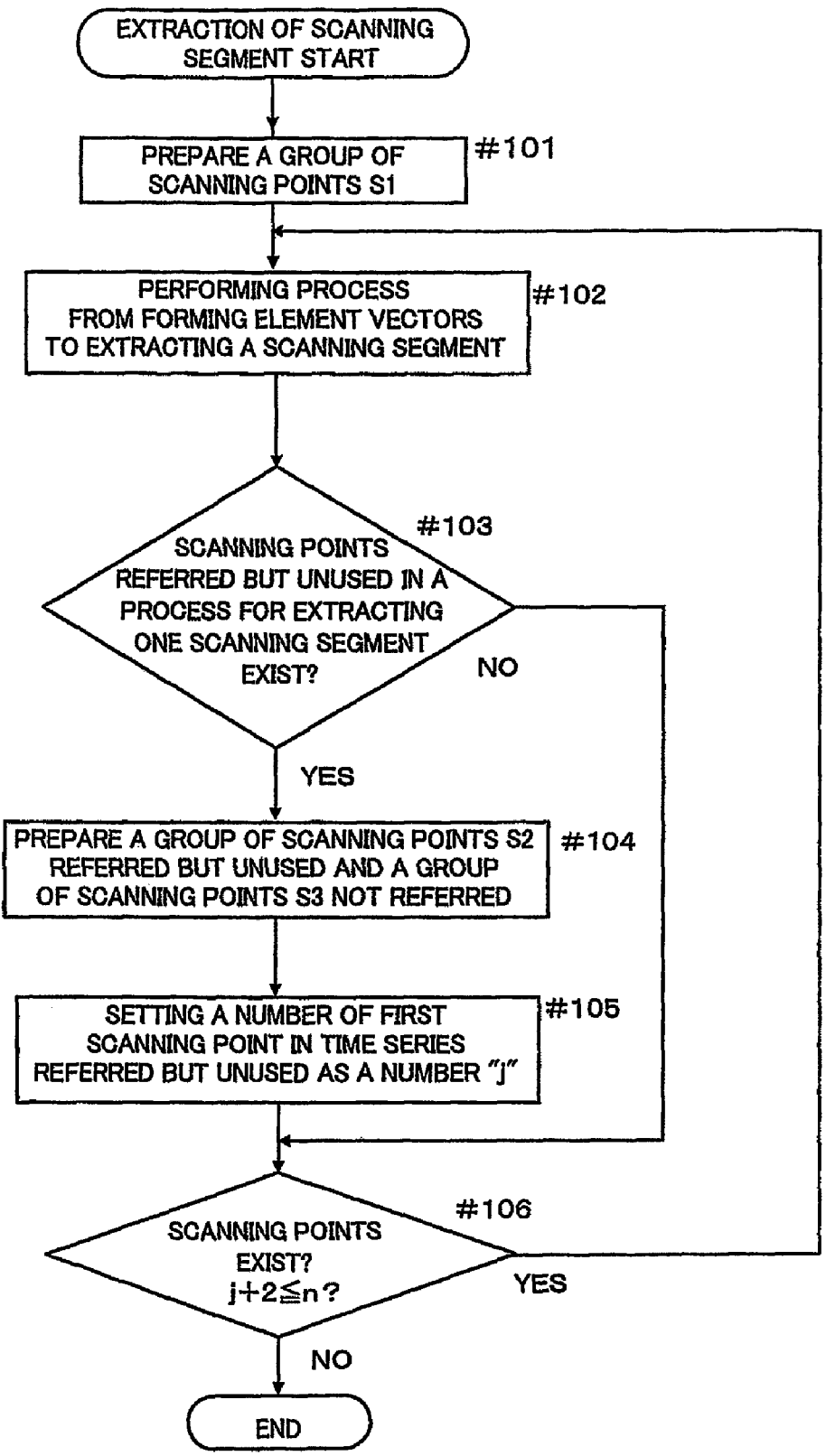
FIG. 27 is a flowchart showing still other steps to form a plurality of scanning segment vectors representing planar obstacles with using scanning points acquired from the dual structure of planar obstacles shown in FIG. 23.

Subsequently, an example that the extraction of the scanning segment is performed in a plurality of times tracing in time series from the scanning points S is described. FIG. 23 shows a state to measure position coordinates of a dual structure of obstacles in which planar obstacles W1 and W2 having apertures exist in front of a planar obstacle W3 having no aperture such as a wall. FIG. 24 shows a state to form a plurality of scanning segment vectors SSV representing planar obstacles from the scanning points S acquired by scanning the dual structure of obstacles shown in FIG. 23 by a laser radar. FIGS. 25, 26 and 27 respectively show three ways of steps to form the scanning segment vectors SSV.

As shown in FIG. 23, the dual structure of obstacles, in which the barrier W1 configured by an arrangement of poles, and a fence W2 having transmission apertures are disposed along a wall W3 of a building, may exist in the operation area of the autonomous vehicle 1. In such a case, double lined scanning points S shown in FIG. 20B or 20C is acquired. When the extraction process of the scanning segments SS is performed with respect to the scanning points serially in time series along the order acquired by the scanning point acquisition unit 12a, the scanning points S on either of the front and rear lines are skipped by introduction of the above mentioned initial skipping parameter "p" or the skipping parameter "k". In case of the dual structure of obstacles, if the autonomous vehicle 1 cannot recognize the planar obstacle having apertures such as the barrier W1 or the fence W2 disposed in front of the wall W3 having no aperture such as the wall, it is unclear which obstacle is detected. Consequently, the precision for specifying the self location of the autonomous vehicle 1 on the map is reduced. In order to prevent such a problem, it is important to form the scanning segment vectors SSV which are lined backward and forward as shown in FIG. 24 and to extract the scanning segments SS representing the obstacles disposed backward and forward from the scanning segment vectors SSV.

In case of dual structure of obstacles, the scanning segment SS of the planar obstacle, for example, disposed behind is extracted from all the scanning points S acquired by the scanning point acquisition unit 12a first, and the scanning segment SS of the planar obstacle disposed in front is extracted from the remained scanning points S which are not used for extraction of the scanning segment SS of the planar obstacle disposed behind.

In the flow shown in FIG. 25, whenever one scanning segment SS is extracted, the extraction of scanning segment SS is performed again with respect to scanning points $S_{SK}$ which were referred in the former extraction of the scanning segment SS but skipped. At first, a group of scanning points S1 is prepared (#81), and the process is performed until the extraction of the scanning segment SS (#82 and #83). This process corresponds to steps #41 to #59 in the flowchart shown in FIG. 7 or FIGS. 21 and 22. The scanning points $S_{SK}$ which are not used due to being skipped among the scanning points S1 referred in the extraction of the scanning segment SS in first stage are recorded as first unused scanning points $S_{UN1}$ which are not used in the first stage (#84).

Subsequently, the extraction of the scanning segments Ss in second stage is performed with respect to the first unused scanning points $S_{UN1}$ (#85 and #86). Then, a group of scanning points $S_{NR}$ which are not referred in the prior process are prepared as new scanning points S1 in the first stage (#87). Hereupon, when no scanning point $S_{NR}$ which is not referred exists, that is, all the scanning points S1 has been referred, the process is completed (NO in step #88). Alternatively, when the scanning points $S_{NR}$ which are not referred exist (YES in step #88), it returns to step #82, and repeats the above mentioned process.

In the flow shown in FIG. 26, after extracting all scanning segments SS which can be extracted with respect to all the scanning points S1, the extraction of the scanning segment SS is performed again with respect to the skipped scanning points $S_{SK}$. At first, a group of scanning points S1 is prepared (#91), and the process is performed until the extraction of the scanning segment SS with respect to all the scanning points S1 (#92 and #93). This process corresponds to performing the flow shown in FIG. 7 or FIGS. 21 and 22 from the start to end. However, it is recorded whether each scanning point S1 is contributed to form a scanning segment vector SSV or not. Subsequently, a group of scanning points $S_{UN}$ which are not contributed to form the scanning segment vectors SSV is prepared (#94).

Subsequently, the extraction of the scanning segment SS is repeated until all the scanning points $S_{UN}$ prepared in step #94 is referred (#95 and #96). In this way, the dual structure of the obstacles can be recognized by extracting the scanning segments SS.

In the flow shown in FIG. 27, whenever one scanning segment SS is extracted, the extraction of scanning segment SS is performed again with respect to scanning points $S_{SK}$ which were unused in the prior process for extracting the scanning segment SS. At first, a group of scanning points S1 is prepared (#101), and the process is performed until the extraction of the scanning segment SS (#102 and #103). This process corresponds to steps #41 to #59 in the flowchart shown in FIG. 7 or FIGS. 21 and 22. When one scanning segment SS is extracted, a group of the scanning points S2 referred but unused in the prior process for extracting the scanning segment SS and a group of scanning points S3 not referred are prepared (#104). Then, the group of scanning points S1 is replaced with a new group of the scanning points combined with the group of the scanning points S2 and the group of scanning points S3 by setting a number of first scanning point S in time series which was refereed but unused as a vector composition point number "j", for example, in step #47 in the flow shown in FIG. 7 (#105).

In the dual structure, for example, shown in FIG. 23, when the scanning segment vector SSV1 representing the planar obstacle (barrier) W2 is extracted first, the scanning segment vector SSV3 representing the planar obstacle (wall) W3 can be extracted prior to the extraction of the scanning segment vector SSV2 representing the planar obstacle (fence) W2. By such a configuration, the length of the scanning segment vector SSV3 can precisely detected, the planar obstacle W3 can be specified precisely, and thereby the self location of the autonomous vehicle 1 on the map can be specified precisely, too.

Figure 28:
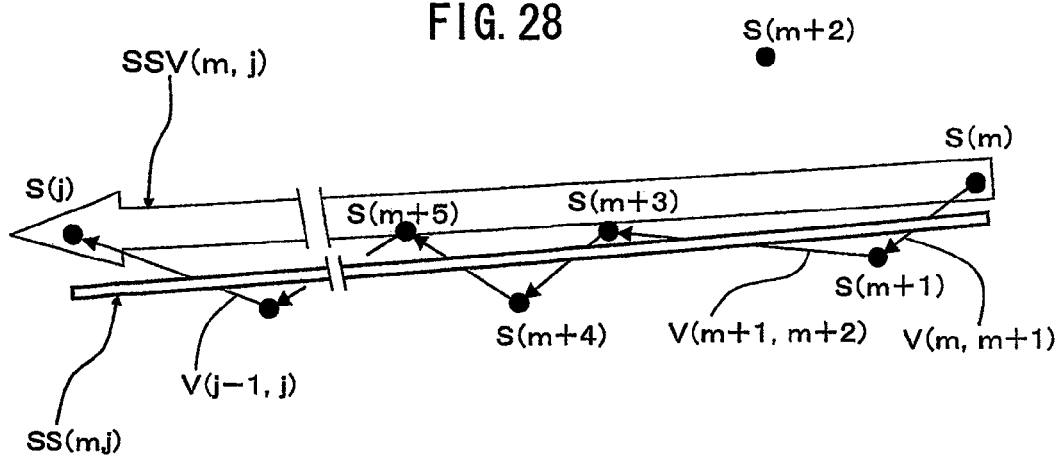
FIG. 28 is a diagram showing a state to acquire a scanning segment from a scanning segment vector with using least-square method in the planar obstacle recognition method in accordance with the present invention.
Figure 29:
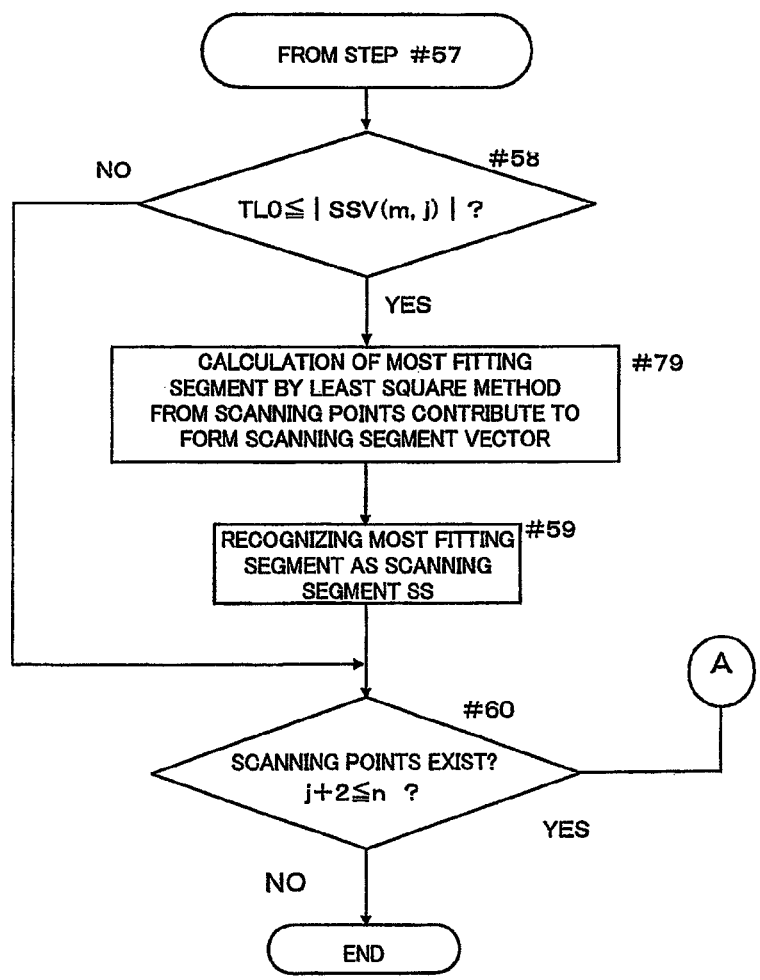
FIG. 29 is a flowchart show steps to acquire the scanning segment with using least square method shown in FIG. 28.

Subsequently, a method for extracting the scanning segment SS precisely and stably is described. FIG. 28 shows a state to extract a scanning segment SS with using least square method from the scanning segment vector SSV formed by one of the above mentioned methods. FIG. 29 shows a flowchart for extracting the scanning segment SS with using least square method. According to the above mentioned methods, the scanning segment vector SSV(m, j) and the scanning segment SS(m, j) are finally decided by the scanning point S(m) serving as a start point and the scanning point S(j) serving as an end point. In other words, the position of the scanning points intervening between the start point and the end point are not considered, so that the positioning accuracy of the scanning segment vector SSV depends on the detection accuracy of the positions of the scanning point S(m) of the start point and the scanning point S(j) of the end point.

Therefore, in the process for forming the scanning segment vector SSV(m, j), position information of the scanning points S which contribute to the composition of the scanning segment vector SSV(m, j) is stored. The positioning information of the scanning points S between the start point and the end point is processed statistically so as to be reflected in the extraction of the scanning segment SS(m, j), thereby enabling the increase of the accuracy of the extraction and ensuring the stability of the scanning segment SS. As for the statistic process, least square method is used. In the flow to extract the scanning segment SS(m, j) shown in FIG. 29, when a length of a segment defined by the start point and the end point of the scanning segment vector SSV(m, j) is equal to or longer than a predetermined length (YES in step #58), least square method is applied to the stored position coordinates of the scanning points S so as to calculate a segment which is the most fitting to the scanning points S (#79), and the segment is extracted as the scanning segment SS (#59).

The scanning segment SS(m, j) which is extracted as above reflects the position information of all the scanning points S which are disposed between the start point and the end point and the scanning segment vector SSV(m, j) and contribute to the composition of the scanning segment vector SSV(m, j), as shown in FIG. 28. Besides, the flow shown in FIG. 29 can be incorporated in the flows shown in FIGS. 6, 7 and 21 and 22.

Figure 30:
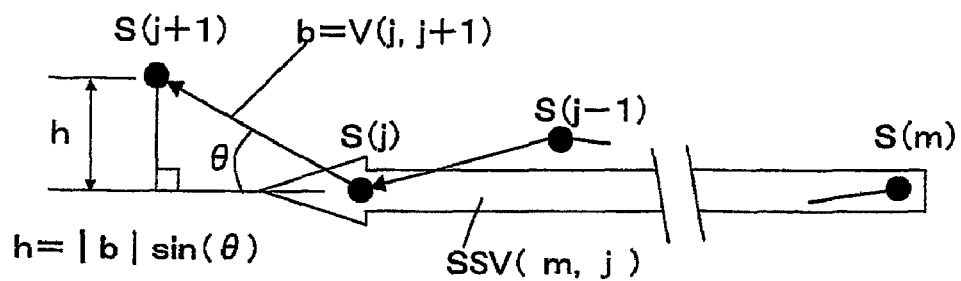
FIG. 30 is an explanation diagram showing another example of composition of element vectors when a scanning segment vector representing a planar obstacle from scanning points in the planar obstacle recognition method in accordance with the present invention.
Figure 31:
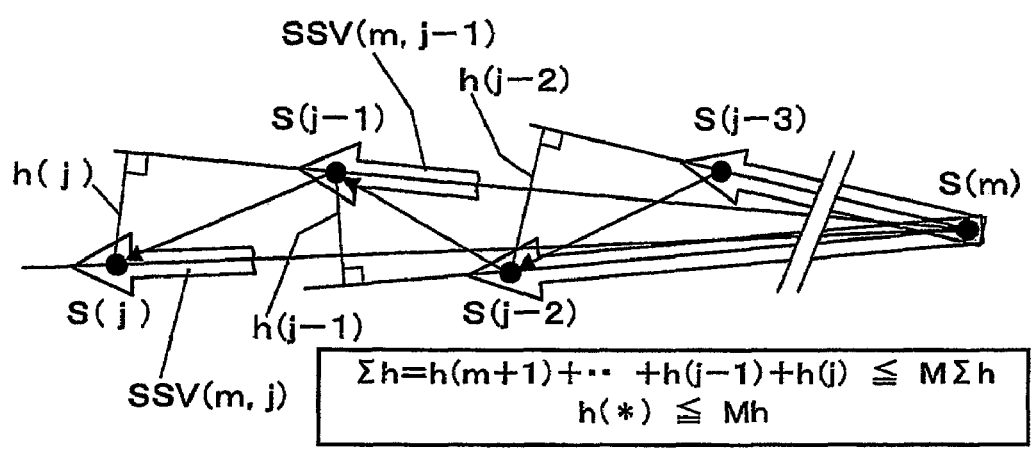
FIG. 31 is an explanation diagram showing judgment of efficiency of the scanning segment vector formed by composition of element vectors shown in FIG. 30.

Subsequently, another method for judging whether the vector composition is possible or not when the scanning segment vector SSV is formed by the composition of the element vectors V is described. FIG. 30 shows a judgmental standard for judging the possibility of composition of element vectors when a scanning segment vector SSV representing a planar obstacle is formed with using scanning points S used in the planar obstacle recognition method in accordance with the present invention. FIG. 31 shows another judgmental standard for judging the possibility of composition of element vectors for forming the scanning segment vector SSV.

In the method shown in FIG. 30, a distance "h" of a foot of a perpendicular from a scanning point S(j+1) which is an end point of an element vector Vb=V(j, j+1) to a scanning segment vector SSV(m, j) is used for the judgment of possibility of the vector composition. That is, when the distance "h" is equal to or shorter than a predetermined value Mh (h≦Mh), the element vector Vb=V(j, j+1) is composed with the scanning segment vector SSV(m, j).

In the method shown in FIG. 31, an integrated value Σh of the distance "h" of the foot of perpendicular from the end points of each element vector V to the scanning segment vector SSV is used to the judgment of the possibility of the vector composition. That is, when the integrated value Σh is equal to or smaller than a predetermined value M Σh (Σh≦M Σh), the vector composition is performed. According to these judgmental standards, there is not trouble of calculation of angles, and the predetermined values Mh and MΣh can be inputted easily.

The present invention is not limited to the above mentioned configuration, and can be modified in various manners. For example, in order to respond to a curved obstacle having a large radius of curvature, a curved surface of the obstacle is represented by map segments of polygonal line, and a scanning segment vector is formed with composition of a plurality of scanning segment vectors so that each scanning segment vector takes a predetermined angle against a continuous scanning segment vector in the same direction.

This application is based on Japanese patent applications 2005-47885 and 2005-279437 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

The invention claimed is:

1. An autonomous vehicle comprising:
    a scanning point acquisition unit scanning a predetermined space at a constant angle or a constant interval with using an electromagnetic wave or an acoustic wave, receiving reflected waves from objects existed in the horizontal plane, and acquiring coordinates of a plurality of scanning points from which the electromagnetic wave or the acoustic wave is reflected;
    an element vector forming unit forming an element vector with respect to two scanning points selected among the plurality of scanning points so that one scanning point acquired earlier in time series by the scanning point acquisition unit is used as a start point of the element vector and another scanning point acquired later is used as an end point of the element vector;
    an element vector selecting unit selecting a plurality of element vectors which are continued in time series of order of formation by the element vector forming unit, length of each element vector being equal to or shorter than a first predetermined length, a deflection angle of an element vector with respect to another continuing element vector being equal to or smaller than a first predetermined angle, and an integrated value of the deflection angles being equal to or smaller than a second predetermined angle;
    a scanning segment vector forming unit forming one scanning segment vector by composing the selected continuing element vectors; and
    an obstacle recognizing unit comparing a segment defined by a start point and an end point of the scanning segment vector with a second predetermined length, and recognizing that a planar obstacle exists along the scanning segment vector when the segment is equal to or longer than the second predetermined length.

2. The autonomous vehicle in accordance with claim 1, wherein
    the element vector formation unit forms an element vector using only scanning points within a predetermined distance from an arbitrary origin.

3. The autonomous vehicle in accordance with claim 1, wherein
    the element vector formation unit sets an arbitrary scanning segment as a first scanning point and a scanning point which is continuous to the first scanning point in time series as a second scanning point so as to form an element vector; and
    when a length of the element vector formed with the first scanning point and the second scanning point is longer than the first predetermined length, the element vector formation unit forms another element vector with the first scanning point and another scanning point which is not continuous to the first scanning point in time series as a new second scanning point.

4. The autonomous vehicle in accordance with claim 3, wherein
when no element vector having a length equal to or shorter than the first predetermined length can be formed with respect to the arbitrary scanning point although attempt to form the element vectors predetermined times, the element vector formation unit sets another scanning point continuous to the arbitrary scanning point in time series as a new first scanning point and attempts to form an element vector with respect to the new first scanning point.

5. The autonomous vehicle in accordance with claim 1, wherein
the element vector formation unit sets an arbitrary scanning segment as a first scanning point, a scanning point which is continuous to the first scanning point in time series as a second scanning point, and a scanning point which is continuous to the second scanning point in time series as a third scanning point so as to form element vectors; and
when a deflection of a second element vector which is formed by the second scanning point as a start point and the third scanning point as an end point with respect to a first element vector which is formed by the first scanning point as a start point and the second scanning point as an end point is larger than the first predetermined angle, the element vector formation unit excludes the third scanning point and forms an element vector with the second scanning vector and another scanning point which is not continuous to the second scanning point in time series as a new third scanning point.

6. The autonomous vehicle in accordance with claim 1, wherein
the element vector formation unit sets an arbitrary scanning segment as a first scanning point and a scanning point which is continuous to the first scanning point in time series as a second scanning point so as to form a first element vector;
when a length of the first element vector formed with the first scanning point and the second scanning point is longer than the first predetermined length, the element vector formation unit forms another element vector with the first scanning point and another scanning point which is not continuous to the first scanning point in time series as a new second scanning point;
the element vector formation unit further sets a scanning point which is continuous to the second scanning point in time series as a third scanning point so as to form element vectors; and
when a deflection of a second element vector which is formed by the second scanning point as a start point and the third scanning point as an end point with respect to a first element vector which is formed by the first scanning point as a start point and the second scanning point as an end point is larger than the first predetermined angle, the element vector formation unit excludes the third scanning point and forms an element vector with the second scanning vector and another scanning point which is not continuous to the second scanning point in time series as a new third scanning point.

7. The autonomous vehicle in accordance with claim 1, wherein
when one scanning segment vector is formed by the scanning segment formation unit, the scanning segment vector formation unit attempts to form a new scanning segment vector using scanning points which are not used for forming the scanning segment vector among a plurality of the scanning points.

8. The autonomous vehicle in accordance with claim 7, wherein
when more than one scanning segment vectors are formed, an angle of a second scanning segment vector against another first scanning segment vector is equal to or smaller than a predetermined angle, and a distance from an end point of the first scanning segment vector and a start point of the second scanning segment vector is equal to or shorter than a predetermined distance, the scanning segment vector formation unit forms a new scanning segment vector by composition of the first scanning segment vector and the second scanning segment vector with composing a vector formed with the end point of the first scanning segment vector as a start point and the start point of the second scanning segment vector as an end point.

9. The autonomous vehicle in accordance with claim 1, wherein
the scanning segment vector formation unit stores positional coordinates of scanning points which contribute to form the scanning segment vector; and
when a segment defined by a start point and an end point of the scanning segment vector is equal to or longer than the second predetermined length, the obstacle recognition unit applies least square method to the stored positional coordinates of the scanning points so as to calculate a segment which is most fining to the scanning points which contribute to form the scanning segment vector, and recognizes that the segments represents a planar obstacle.

10. The autonomous vehicle in accordance with claim 1, wherein
the element vector formation unit forms a first group of element vectors with a first scanning point as a start point and a second scanning point as an end point, wherein an arbitrary scanning point is set as the first scanning point and another scanning point continuous to the first scanning point in time series is set as the second scanning point;
the element vector formation unit further forms a second group of element vectors with a first scanning point as a start point and a second scanning point as an end point, wherein an arbitrary scanning point as the first scanning point and another scanning point continuous to the first scanning point in time series as the second scanning point when a length of the element vector is equal to or shorter than the first predetermined length, or scanning point approximate to but not continuous to the first scanning point in time series as the second scanning point when a length of the element vector is longer than the first predetermined length;
the element vector selection unit selects a plurality of continuous element vectors from the first group of element vectors and selects a plurality of continuous element vectors from the second group of element vectors;
the scanning segment vector formation unit forms a first group of scanning segments by composition of a plurality of the element vectors selected from the first group of element vectors, and forms a second group of scanning segments by composition of a plurality of the element vectors selected from the second group of element vectors, and subtracts element vectors which form the first group of scanning segments from element vectors which form the second group of scanning segments, so that a third group of scanning segment vectors is formed with remained element vectors; and the obstacle recognition unit compares a segment defined by a start point and an end point of a scanning segment vector belonging to the third group of the scanning segment vectors with the second predetermined length, and when the length of the segment is equal to or longer than the second predetermined length, it recognizes that a planar obstacle having apertures exists along the scanning segment vector belonging the third group of the scanning segment vectors.

11. The autonomous vehicle in accordance with claim 1 further comprising:

a memory which previously memorizes data of map segments which are an aggregation of segments of the planar obstacles existing in a map of an operation area of the autonomous vehicle; and wherein the obstacle recognition unit further serves as a segment collation unit, which collates the scanning segment with map segments, specifies positions of the planar obstacles on the map and further specifies a self location of the autonomous vehicle on the map.

12. The autonomous vehicle in accordance with claim 11, wherein the self location identification unit specifies the self location of the autonomous vehicle on the map of the operation area thereof based on the positions of the planar obstacles on the map, and distances and directions to the planar obstacles from an origin on the autonomous vehicle.

13. A planar object recognition method comprising:

a scanning point acquisition step for scanning a predetermined space at a constant angle or a constant interval with using an electromagnetic wave or an acoustic wave, receiving reflected waves from objects existed in the horizontal plane, and acquiring coordinates of a plurality of scanning points from which the electromagnetic wave or the acoustic wave is reflected;

an element vector forming step forming an element vector with respect to two scanning points selected among the plurality of scanning points so that one scanning point acquired earlier in time series by the scanning point acquisition step is used as a start point of the element vector and another scanning point acquired later is used as an end point of the element vector;

an element vector selecting step selecting a plurality of element vectors which are continued in time series of order of formation by the element vector forming step, length of each element vector being equal to or shorter than a first predetermined length, a deflection angle of an element vector with respect to another continuing element vector being equal to or smaller than a first predetermined angle, and an integrated value of the deflection angles being equal to or smaller than a second predetermined angle;

a scanning segment vector forming step forming one scanning segment vector by composing the selected continuing element vectors; and an obstacle recognizing step comparing a segment defined by a start point and an end point of the scanning segment vector with a second predetermined length, and recognizing that a planar obstacle exists along the scanning segment vector when the segment is equal to or longer than the second predetermined length.

14. The planar object recognition method with claim 13, wherein the element vector formation step forms an element vector using only scanning points within a predetermined distance from an arbitrary origin.

15. The planar object recognition method in accordance with claim 13, wherein the element vector formation step sets an arbitrary scanning segment as a first scanning point and a scanning point which is continuous to the first scanning point in time series as a second scanning point so as to form an element vector; and when a length of the element vector formed with the first scanning point and the second scanning point is longer than the first predetermined length, the element vector formation step forms another element vector with the first scanning point and another scanning point which is not continuous to the first scanning point in time series as a new second scanning point.

16. The planar object recognition method in accordance with claim 15, wherein when no element vector having a length equal to or shorter than the first predetermined length can be formed with respect to the arbitrary scanning point although attempt to form the element vectors predetermined times, the element vector formation step sets another scanning point continuous to the arbitrary scanning point in time series as a new first scanning point and attempts to form an element vector with respect to the new first scanning point.

17. The planar object recognition method in accordance with claim 13, wherein the element vector formation step sets an arbitrary scanning segment as a first scanning point, a scanning point which is continuous to the first scanning point in time series as a second scanning point, and a scanning point which is continuous to the second scanning point in time series as a third scanning point so as to form element vectors; and when a deflection of a second element vector which is formed by the second scanning point as a start point and the third scanning point as an end point with respect to a first element vector which is formed by the first scanning point as a start point and the second scanning point as an end point is larger than the first predetermined angle, the element vector formation step excludes the third scanning point and forms an element vector with the second scanning vector and another scanning point which is not continuous to the second scanning point in time series as a new third scanning point.

18. The planar object recognition method in accordance with claim 13, wherein the element vector formation step sets an arbitrary scanning segment as a first scanning point and a scanning point which is continuous to the first scanning point in time series as a second scanning point so as to form a first element vector;

when a length of the first element vector formed with the first scanning point and the second scanning point is longer than the first predetermined length, the element vector formation step forms another element vector with the first scanning point and another scanning point which is not continuous to the first scanning point in time series as a new second scanning point;

the element vector formation step further sets a scanning point which is continuous to the second scanning point in time series as a third scanning point so as to form element vectors; and when a deflection of a second element vector which is formed by the second scanning point as a start point and the third scanning point as an end point with respect to a first element vector which is formed by the first scanning point as a start point and the second scanning point as an end point is larger than the first predetermined angle, the element vector formation step excludes the third scanning point and forms an element vector with the second scanning vector and another scanning point which is not continuous to the second scanning point in time series as a new third scanning point.

19. The planar object recognition method in accordance with claim 13, wherein
when one scanning segment vector is formed by the scanning segment formation step, the scanning segment vector formation step attempts to form a new scanning segment vector using scanning points which are not used for forming the scanning segment vector among a plurality of the scanning points.

20. The planar object recognition method in accordance with claim 19, wherein
when more than one scanning segment vectors are formed, an angle of a second scanning segment vector against another first scanning segment vector is equal to or smaller than a predetermined angle, and a distance from an end point of the first scanning segment vector and a start point of the second scanning segment vector is equal to or shorter than a predetermined distance, the scanning segment vector formation step forms a new scanning segment vector by composition of the first scanning segment vector and the second scanning segment vector with composing a vector formed with the end point of the first scanning segment vector as a start point and the start point of the second scanning segment vector as an end point.

21. The planar object recognition method in accordance with claim 13, wherein
the scanning segment vector formation step stores positional coordinates of scanning points which contribute to form the scanning segment vector; and
when a segment defined by a start point and an end point of the scanning segment vector is equal to or longer than the second predetermined length, the obstacle recognition step applies least square method to the stored positional coordinates of the scanning points so as to calculate a segment which is most fitting to the scanning points which contribute to form the scanning segment vector, and recognizes that the segments represents a planar obstacle.

22. The planar object recognition method in accordance with claim 13, wherein
the element vector formation step forms a first group of element vectors with a first scanning point as a start point and a second scanning point as an end point, wherein an arbitrary scanning point is set as the first scanning point and another scanning point continuous to the first scanning point in time series is set as the second scanning point;
the element vector formation step further forms a second group of element vectors with a first scanning point as a start point and a second scanning point as an end point, wherein an arbitrary scanning point as the first scanning point and another scanning point continuous to the first scanning point in time series as the second scanning point when a length of the element vector is equal to or shorter than the first predetermined length, or scanning point approximate to but not continuous to the first scanning point in time series as the second scanning point when a length of the element vector is longer than the first predetermined length;
the element vector selection step selects a plurality of continuous element vectors from the first group of element vectors and selects a plurality of continuous element vectors from the second group of element vectors;
the scanning segment vector formation step forms a first group of scanning segments by composition of a plurality of the element vectors selected from the first group of element vectors, and forms a second group of scanning segments by composition of a plurality of the element vectors selected from the second group of element vectors, and subtracts element vectors which form the first group of scanning segments from element vectors which form the second group of scanning segments, so that a third group of scanning segment vectors is formed with remained element vectors; and
the obstacle recognition step compares a segment defined by a start point and an end point of a scanning segment vector belonging to the third group of the scanning segment vectors with the second predetermined length, and when the length of the segment is equal to or longer than the second predetermined length, it recognizes that a planar obstacle having apertures exists along the scanning segment vector belonging the third group of the scanning segment vectors.

\* \* \* \* \*

UNITED STATES PATENT AND TRADEMARK OFFICE
CERTIFICATE OF CORRECTION

PATENT NO. : 7,742,841 B2
APPLICATION NO. : 11/813964
DATED : June 22, 2010
INVENTOR(S) : Tatsuo Sakai et al.

It is certified that error appears in the above-identified patent and that said Letters Patent is hereby corrected as shown below:

On the Title page, Item (75) Inventors, change "Tatsu Sakai" to --Tatsuo Sakai--.

Signed and Sealed this

Fourteenth Day of September, 2010

David J. Kappos
*Director of the United States Patent and Trademark Office*